US011706737B2

(12) United States Patent
Xu et al.

(10) Patent No.: US 11,706,737 B2
(45) Date of Patent: Jul. 18, 2023

(54) TECHNIQUES FOR PAGING EARLY INDICATION REPETITION

(71) Applicant: QUALCOMM Incorporated, San Diego, CA (US)

(72) Inventors: Huilin Xu, Temecula, CA (US); Le Liu, Fremont, CA (US); Wooseok Nam, San Diego, CA (US); Yuchul Kim, San Diego, CA (US); Ozcan Ozturk, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 17/377,337

(22) Filed: Jul. 15, 2021

(65) Prior Publication Data

US 2023/0017853 A1    Jan. 19, 2023

(51) Int. Cl.
*H04W 68/00* (2009.01)
*H04W 72/12* (2023.01)

(52) U.S. Cl.
CPC ......... *H04W 68/005* (2013.01); *H04W 72/12* (2013.01)

(58) Field of Classification Search
CPC ........... H04W 68/005; H04W 72/1205; H04W 72/12; H04W 52/0216; H04W 52/0229; H04W 68/025; H04W 76/28; H04W 68/02
USPC ...................................... 455/426.1, 458, 515
See application file for complete search history.

(56) References Cited

U.S. PATENT DOCUMENTS

| 2009/0088148 A1* | 4/2009 | Chung | H04L 5/0053 |
| | | | 455/423 |
| 2013/0150095 A1* | 6/2013 | Mehio | H04W 68/005 |
| | | | 455/458 |
| 2018/0227942 A1* | 8/2018 | Hwang | H04W 72/23 |
| 2020/0367200 A1* | 11/2020 | Tang | H04W 68/02 |

OTHER PUBLICATIONS

International Search Report and Written Opinion—PCT/US2022/034075—ISA/EPO—dated Sep. 16, 2022.

(Continued)

*Primary Examiner* — Michael Y Mapa
(74) *Attorney, Agent, or Firm* — Holland & Hart LLP

(57) ABSTRACT

Methods, systems, and devices for wireless communications are described. A base station may transmit multiple repetitions of a paging early indication (PEI) signal to a user equipment (UE) to indicate that the UE is to receive paging signaling in a paging occasion. In some cases, a PEI occasion for transmitting a PEI repetition may have a scheduling conflict. For example, a PEI occasion may collide with other downlink signaling. A UE may implement techniques to resolve scheduling conflicts or collisions for PEI repetitions. For example, the UE may be configured to receive either colliding PEI signaling or colliding downlink signaling based on priorities of the signaling. Additionally, or alternatively, PEI signaling may be shifted (e.g., delayed) until after the downlink signaling ends. In some cases, a UE may be configured with a subset of blind decoding hypotheses for PEI decoding.

33 Claims, 20 Drawing Sheets

(56) References Cited

OTHER PUBLICATIONS

Moderator (Mediatek): "Summary of Paging Enhancements", 3GPP TSG Ran WG1 #105-e, R1-2106143, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, 95 pages, Jun. 2, 2021, XP052019153, Sections 1, 2, 3.1, 4 and 5.
Qualcomm Incorporated: "Paging Enhancements for Idle/Inactive UE Power Saving", 3GPP TSG-RAN WG1 #1 05-e, R1-2104682,3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 16 Pages, XP052010933, Sections 1-4.
Sony: "Discussion on Potential Paging Enhancements", 3GPP TSG RAN WG1 #105, R1-2105174, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 6 Pages, XP052011253, Sections 1-3.
ZTE, et al., "Discussion on Power Saving Enhancements for Paging", 3GPP TSG RAN WG1 #105-e, R1-2104221, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021 ,33 Pages, XP052010681, Sections 1-4.

\* cited by examiner

TECHNIQUES FOR PAGING EARLY INDICATION REPETITION

FIELD OF TECHNOLOGY

The following relates to wireless communications, including techniques for paging early indication (PEI) repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a base station may transmit a paging early indication (PEI) to a UE prior to a paging occasion for the UE to indicate whether the UE is to receive a paging message within the paging occasion. In some cases, the base station may transmit multiple repetitions of a PEI to the UE to provide a higher likelihood of the UE decoding the PEI. Some techniques for PEI repetition are deficient.

SUMMARY

The described techniques relate to improved methods, systems, devices, and apparatuses that support techniques for paging early indication (PEI) repetition. Generally, the described techniques provide for resolving scheduling conflicts or collisions involving repetitions of a PEI. A base station may transmit multiple repetitions of a PEI signal to a user equipment (UE) to indicate that the UE is to receive paging signaling in a paging occasion. In some cases, a PEI occasion for transmitting a PEI repetition may have a scheduling conflict. For example, a PEI occasion may collide with other downlink signaling, or a PEI occasion may be scheduled for an uplink-configured symbol period. A UE may implement techniques to resolve scheduling conflicts or collisions for PEI repetitions. For example, the UE may be configured to either prioritize receiving the PEI signaling or to prioritize receiving the downlink signaling. Additionally, or alternatively, PEI occasions for the PEI repetitions may be shifted (e.g., delayed) to a first non-colliding symbol period (e.g., delayed until after the downlink signaling ends). In some examples, the UE may be indicated a number of actually transmitted PEI repetitions, such as if the number of actually transmitted PEI repetitions is different from a maximum number of PEI repetitions that can be transmitted for one paging occasion. In some cases, a UE may be configured with a subset of blind decoding hypotheses for PEI decoding. For example, the base station may transmit PEI signaling according to subsets of PEI occasions. If the base station does not transmit PEI signaling in one PEI occasion of a subset of PEI occasions, the base station may not transmit PEI signaling in any PEI occasion of that subset of PEI occasions. Additionally, or alternatively, the UE may be configured with a PEI window. The base station may transmit PEI signaling in PEI occasions within the PEI window, and the UE may monitor for the PEI signaling within the PEI window.

A method for wireless communications at a UE is described. The method may include receiving signaling indicating a PEI configuration associated with an idle or inactive mode for the UE, determining a scheduling conflict during one or more symbols based on a set of PEI occasions being scheduled for at least the one or more symbols based on the PEI configuration, and monitoring for at least a portion of the set of PEI occasions based on determining the scheduling conflict.

An apparatus for wireless communications at a UE is described. The apparatus may include a processor, memory coupled with the processor, and instructions stored in the memory. The instructions may be executable by the processor to cause the apparatus to receive signaling indicating a PEI configuration associated with an idle or inactive mode for the UE, determine a scheduling conflict during one or more symbols based on a set of PEI occasions being scheduled for at least the one or more symbols based on the PEI configuration, and monitor for at least a portion of the set of PEI occasions based on determining the scheduling conflict.

Another apparatus for wireless communications at a UE is described. The apparatus may include means for receiving signaling indicating a PEI configuration associated with an idle or inactive mode for the UE, means for determining a scheduling conflict during one or more symbols based on a set of PEI occasions being scheduled for at least the one or more symbols based on the PEI configuration, and means for monitoring for at least a portion of the set of PEI occasions based on determining the scheduling conflict.

A non-transitory computer-readable medium storing code for wireless communications at a UE is described. The code may include instructions executable by a processor to receive signaling indicating a PEI configuration associated with an idle or inactive mode for the UE, determine a scheduling conflict during one or more symbols based on a set of PEI occasions being scheduled for at least the one or more symbols based on the PEI configuration, and monitor for at least a portion of the set of PEI occasions based on determining the scheduling conflict.

In some examples of the method, apparatuses, and non-transitory computer-readable medium described herein, the monitoring may include operations, features, means, or instructions for monitoring for PEI signaling during the one or more symbols or monitoring for downlink signaling during the one or more symbols based on the PEI configuration, where the scheduling conflict may be based on the downlink signaling being scheduled during the one or more symbols.

Some examples of the method, apparatuses, and non-transitory computer-readable medium described herein may further include operations, features, means, or instructions for receiving the PEI signaling during the one or more symbols based on the PEI configuration assigning a higher priority to the PEI signaling than the downlink signaling.

In some examples of the method, apparatuses, and non-transitory computer-readable medium described herein, the monitoring may include operations, features, means, or instructions for receiving the downlink signaling during the one or more symbols based on the PEI configuration assigning a higher priority to the downlink signaling than the PEI signaling.

In some examples of the method, apparatuses, and non-transitory computer-readable medium described herein, the downlink signaling includes physical downlink control channel (PDCCH) signaling scheduling a paging message, PDCCH signaling scheduling system information, a synchronization signal block (SSB), a physical downlink shared channel (PDSCH) carrying system information, a tracking reference signal (TRS), or any combination thereof.

In some examples of the method, apparatuses, and non-transitory computer-readable medium described herein, the monitoring may include operations, features, means, or instructions for monitoring for PEI signaling during a shifted set of PEI occasions based on determining the scheduling conflict, where the shifted set of PEI occasions start at a first symbol period after the scheduling conflict.

In some examples of the method, apparatuses, and non-transitory computer-readable medium described herein, the monitoring may include operations, features, means, or instructions for monitoring for PEI signaling during the portion of the set of PEI occasions excluding the one or more symbols based on determining the scheduling conflict.

In some examples of the method, apparatuses, and non-transitory computer-readable medium described herein, receiving the signaling indicating the PEI configuration may include operations, features, means, or instructions for receiving an indication of a maximum number of PEI repetitions occasions associated with a paging occasion.

Some examples of the method, apparatuses, and non-transitory computer-readable medium described herein may further include operations, features, means, or instructions for receiving an indication of a number of transmitted PEI occasion repetitions in the set of PEI occasions.

In some examples of the method, apparatuses, and non-transitory computer-readable medium described herein, the indication may be received via a system information block (SIB), a previous PEI signal, PDCCH signaling scheduling a paging message, or any combination thereof.

In some examples of the method, apparatuses, and non-transitory computer-readable medium described herein, the indication includes an indication of a pattern for the set of PEI occasions.

Some examples of the method, apparatuses, and non-transitory computer-readable medium described herein may further include operations, features, means, or instructions for performing blind decoding on the set of PEI occasions, where a number of PEI occasion repetitions associated with the set of PEI occasions may be based on a blind decoding capability of the UE.

Some examples of the method, apparatuses, and non-transitory computer-readable medium described herein may further include operations, features, means, or instructions for performing blind decoding on a first PEI occasion corresponding to a first subset of the set of PEI occasions, ignoring remaining PEI occasions corresponding to the first subset of the set of PEI occasions based on the blind decoding on the first PEI occasion being unsuccessful, and performing blind decoding on a second subset of the set of PEI occasions.

Some examples of the method, apparatuses, and non-transitory computer-readable medium described herein may further include operations, features, means, or instructions for performing blind decoding on a first PEI occasion corresponding to a subset of the set of PEI occasions and ignoring a remaining subset of PEI occasions based on the blind decoding on the first PEI occasion being successful.

Some examples of the method, apparatuses, and non-transitory computer-readable medium described herein may further include operations, features, means, or instructions for receiving an indication of the scheduling conflict during the one or more symbols and monitoring for PEI signaling during the portion of the set of PEI occasions based on receiving the indication of the scheduling conflict.

In some examples of the method, apparatuses, and non-transitory computer-readable medium described herein, the monitoring may include operations, features, means, or instructions for monitoring for PEI signaling during the one or more symbols until detection of the PEI signaling or until a threshold number of PEI occasions may have been monitored.

In some examples of the method, apparatuses, and non-transitory computer-readable medium described herein, the monitoring may include operations, features, means, or instructions for monitoring for PEI signaling during at least the portion of the set of PEI occasions based on being scheduled for a set of multiple sets of PEI sets.

Some examples of the method, apparatuses, and non-transitory computer-readable medium described herein may further include operations, features, means, or instructions for receiving, via PEI signaling in a PEI occasion or paging signaling in a paging occasion, an indication to stop monitoring for a remaining portion of the set of PEI occasions and refraining from monitoring for the remaining portion of the set of PEI occasions.

Some examples of the method, apparatuses, and non-transitory computer-readable medium described herein may further include operations, features, means, or instructions for refraining from monitoring for PEI signaling during the one or more symbols based on the set of PEI occasions having the scheduling conflict with one or more uplink symbols.

In some examples of the method, apparatuses, and non-transitory computer-readable medium described herein, the determining may include operations, features, means, or instructions for determining the scheduling conflict based on a scheduling of downlink signaling during the one or more symbols.

In some examples of the method, apparatuses, and non-transitory computer-readable medium described herein, the determining may include operations, features, means, or instructions for determining the scheduling conflict based on a slot format of a slot including the one or more symbols, the slot format configuring the one or more symbols as uplink symbols.

In some examples of the method, apparatuses, and non-transitory computer-readable medium described herein, the determining may include operations, features, means, or instructions for performing blind decoding during one or more paging early indications of the set of paging early indication occasions without detecting paging early indication signaling.

A method for wireless communications at a UE is described. The method may include receiving signaling indicating a configuration for a PEI window associated with a set of multiple PEI occasions, the PEI window separated from a paging occasion by a gap in time and determining whether to monitor, while operating in an inactive or idle mode, for PEI signaling during one or more of the set of multiple PEI occasions within the PEI window based on the configuration.

An apparatus for wireless communications at a UE is described. The apparatus may include a processor, memory coupled with the processor, and instructions stored in the memory. The instructions may be executable by the processor to cause the apparatus to receive signaling indicating a configuration for a PEI window associated with a set of multiple PEI occasions, the PEI window separated from a paging occasion by a gap in time and determine whether to monitor, while operating in an inactive or idle mode, for PEI signaling during one or more of the set of multiple PEI occasions within the PEI window based on the configuration.

Another apparatus for wireless communications at a UE is described. The apparatus may include means for receiving signaling indicating a configuration for a PEI window associated with a set of multiple PEI occasions, the PEI window separated from a paging occasion by a gap in time and means for determining whether to monitor, while operating in an inactive or idle mode, for PEI signaling during one or more of the set of multiple PEI occasions within the PEI window based on the configuration.

A non-transitory computer-readable medium storing code for wireless communications at a UE is described. The code may include instructions executable by a processor to receive signaling indicating a configuration for a PEI window associated with a set of multiple PEI occasions, the PEI window separated from a paging occasion by a gap in time and determine whether to monitor, while operating in an inactive or idle mode, for PEI signaling during one or more of the set of multiple PEI occasions within the PEI window based on the configuration.

Some examples of the method, apparatuses, and non-transitory computer-readable medium described herein may further include operations, features, means, or instructions for monitoring for PEI signaling during the one or more of the set of multiple PEI occasions within the PEI window based on the configuration and monitoring for PDCCH signaling during the paging occasion based on detecting the PEI signaling during the one or more of the set of multiple PEI occasions.

In some examples of the method, apparatuses, and non-transitory computer-readable medium described herein, the monitoring may include operations, features, means, or instructions for monitoring for PEI signaling during a subset of the set of multiple PEI occasions based on determining a scheduling conflict for a remaining subset of PEI occasions.

Some examples of the method, apparatuses, and non-transitory computer-readable medium described herein may further include operations, features, means, or instructions for determining none of the set of multiple PEI occasions may be configured within the PEI window and monitoring for PDCCH signaling scheduling paging messages during the paging occasion based on none of the set of multiple PEI occasions being configured within the PEI window.

Some examples of the method, apparatuses, and non-transitory computer-readable medium described herein may further include operations, features, means, or instructions for determining none of the set of multiple PEI occasions may be configured within the PEI window and refraining from monitoring for PDCCH signaling scheduling paging messages during the paging occasion based on none of the set of multiple PEI occasions being configured within the PEI window.

A method for wireless communications at a base station is described. The method may include transmitting signaling indicating a PEI configuration associated with an idle or inactive mode for a UE, determining a scheduling conflict during one or more symbols based on a set of PEI occasions being scheduled for at least the one or more symbols based on the PEI configuration, and transmitting PEI signaling during at least a portion of the set of PEI occasions based on determining the scheduling conflict.

An apparatus for wireless communications at a base station is described. The apparatus may include a processor, memory coupled with the processor, and instructions stored in the memory. The instructions may be executable by the processor to cause the apparatus to transmit signaling indicating a PEI configuration associated with an idle or inactive mode for a UE, determine a scheduling conflict during one or more symbols based on a set of PEI occasions being scheduled for at least the one or more symbols based on the PEI configuration, and transmit PEI signaling during at least a portion of the set of PEI occasions based on determining the scheduling conflict.

Another apparatus for wireless communications at a base station is described. The apparatus may include means for transmitting signaling indicating a PEI configuration associated with an idle or inactive mode for a UE, means for determining a scheduling conflict during one or more symbols based on a set of PEI occasions being scheduled for at least the one or more symbols based on the PEI configuration, and means for transmitting PEI signaling during at least a portion of the set of PEI occasions based on determining the scheduling conflict.

A non-transitory computer-readable medium storing code for wireless communications at a base station is described. The code may include instructions executable by a processor to transmit signaling indicating a PEI configuration associated with an idle or inactive mode for a UE, determine a scheduling conflict during one or more symbols based on a set of PEI occasions being scheduled for at least the one or more symbols based on the PEI configuration, and transmit PEI signaling during at least a portion of the set of PEI occasions based on determining the scheduling conflict.

In some examples of the method, apparatuses, and non-transitory computer-readable medium described herein, the transmitting may include operations, features, means, or instructions for transmitting the PEI signaling during the one or more symbols or transmitting downlink signaling during the one or more symbols based on the PEI configuration, where the scheduling conflict may be based on the downlink signaling and the set of PEI occasions being scheduled during the one or more symbols.

In some examples of the method, apparatuses, and non-transitory computer-readable medium described herein, the transmitting may include operations, features, means, or instructions for transmitting the PEI signaling during a shifted set of PEI occasions based on the scheduling conflict, where the shifted set of PEI occasions start at a first symbol period after the scheduling conflict.

In some examples of the method, apparatuses, and non-transitory computer-readable medium described herein, the transmitting may include operations, features, means, or instructions for transmitting the PEI signaling during the portion of the set of PEI occasions excluding the one or more symbols based on the scheduling conflict.

In some examples of the method, apparatuses, and non-transitory computer-readable medium described herein, transmitting the signaling indicating the PEI configuration may include operations, features, means, or instructions for transmitting an indication of a maximum number of PEI repetitions occasions associated with a paging occasion.

Some examples of the method, apparatuses, and non-transitory computer-readable medium described herein may further include operations, features, means, or instructions for transmitting an indication of a number of PEI occasion repetitions in the set of PEI occasions.

Some examples of the method, apparatuses, and non-transitory computer-readable medium described herein may further include operations, features, means, or instructions for transmitting the PEI signaling on a subset of PEI occasions of the set of PEI occasions and refraining from transmitting the PEI signaling on a remaining subset of PEI occasions of the set of PEI occasions.

A method for wireless communications at a base station is described. The method may include transmitting signaling indicating a configuration for a PEI window including a set of multiple PEI occasions, the PEI window separated from a paging occasion by a gap in time and transmitting, to a UE operating in an inactive or idle mode, PEI signaling during one or more of the set of multiple PEI occasions within the PEI window based on the configuration.

An apparatus for wireless communications at a base station is described. The apparatus may include a processor, memory coupled with the processor, and instructions stored in the memory. The instructions may be executable by the processor to cause the apparatus to transmit signaling indicating a configuration for a PEI window including a set of multiple PEI occasions, the PEI window separated from a paging occasion by a gap in time and transmit, to a UE operating in an inactive or idle mode, PEI signaling during one or more of the set of multiple PEI occasions within the PEI window based on the configuration.

Another apparatus for wireless communications at a base station is described. The apparatus may include means for transmitting signaling indicating a configuration for a PEI window including a set of multiple PEI occasions, the PEI window separated from a paging occasion by a gap in time and means for transmitting, to a UE operating in an inactive or idle mode, PEI signaling during one or more of the set of multiple PEI occasions within the PEI window based on the configuration.

A non-transitory computer-readable medium storing code for wireless communications at a base station is described. The code may include instructions executable by a processor to transmit signaling indicating a configuration for a PEI window including a set of multiple PEI occasions, the PEI window separated from a paging occasion by a gap in time and transmit, to a UE operating in an inactive or idle mode, PEI signaling during one or more of the set of multiple PEI occasions within the PEI window based on the configuration.

DETAILED DESCRIPTION

Figure 1:
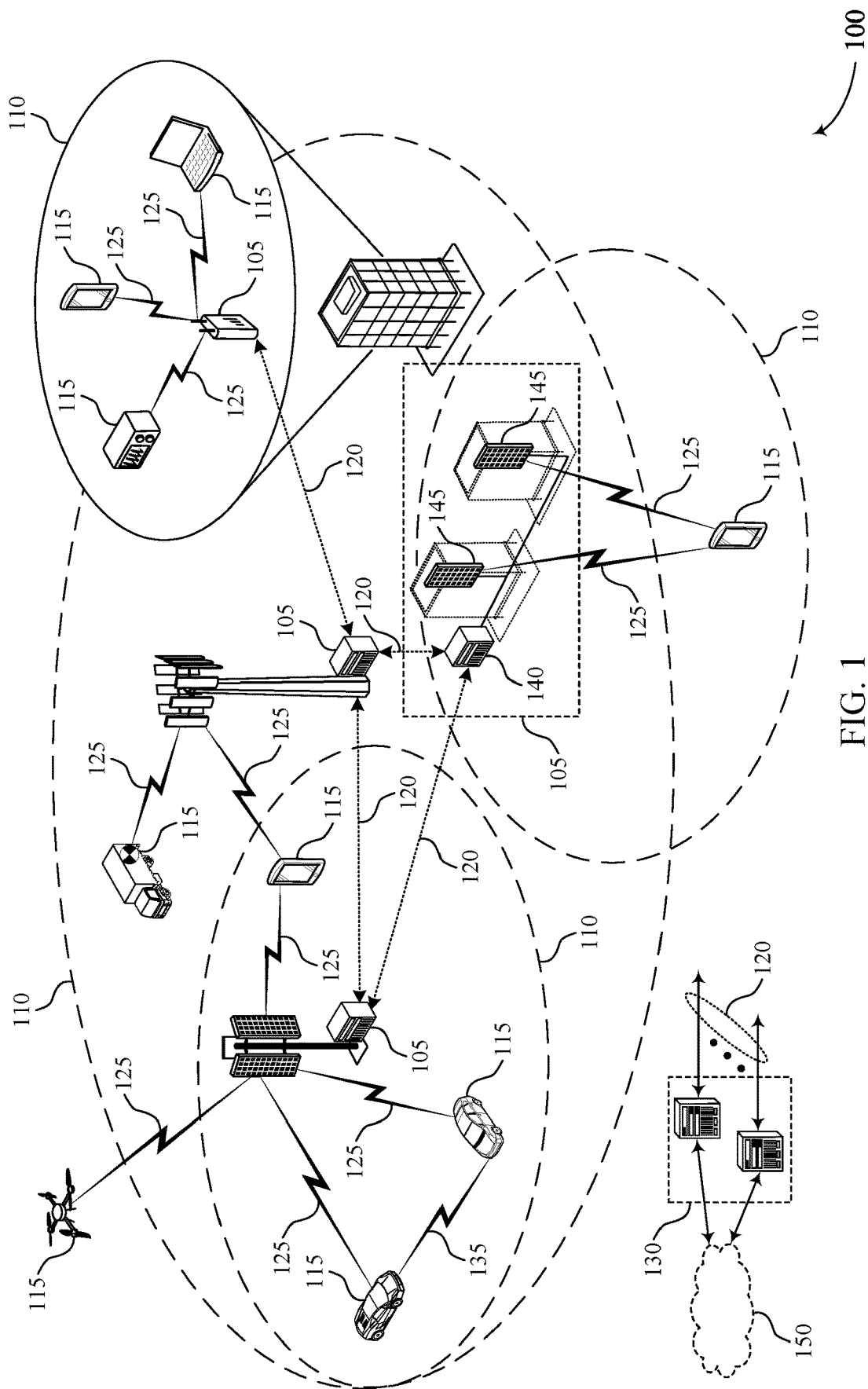
FIG. 1 illustrates an example of a wireless communications system that supports techniques for paging early indication (PEI) repetition in accordance with aspects of the present disclosure.

In some wireless communications systems, a user equipment (UE) may operate in a radio resource control (RRC) idle mode or an RRC inactive mode, each of which may be referred to as an inactive state, until the UE has data to transmit or receive (e.g., or another operation to perform via a network connection). The UE may communicate with the network by establishing an RRC connection and transitioning to an RRC connected mode, which may be referred to as an active state. The UE may be configured with a discontinuous reception (DRX) cycle for paging (e.g., a paging cycle), which may indicate how frequently the UE may monitor a paging channel for paging from the network. The UE may monitor for paging according to the DRX cycle while operating in the inactive state to reduce power consumption, and a paging message may indicate whether the UE is to transition to an active state to receive data. In some cases, the network may transmit a paging early indication (PEI) to the UE to indicate whether a subsequent paging occasion includes a scheduled paging message for the UE. For example, a base station may transmit a PEI to indicate whether the UE is paged before the paging opportunity. Some UEs may be configured into sub-groups for PEI signaling, where a PEI transmission indicates groups of UEs to wake up for a paging occasion. PEI techniques may improve power savings at a UE, such as by reducing unnecessary paging physical downlink shared channel (PDSCH) decoding, enabling a UE to skip synchronization signal block (SSB) reception for tracking loop updates for PDSCH decoding, and reducing wakeup duration when PEI is place close to an SSB.

In some examples, a base station may transmit repetitions of a PEI in multiple PEI occasions. Transmitting repetitions of PEI may provide a higher signal-to-noise ratio (SNR), account for different UE implementations, or account for potential listen-before-talk (LBT) failure in unlicensed spectrum. When PEI repetition is configured, some of the repetitions may be scheduled to collide with other signaling. For example, one or more of the PEI repetitions may be scheduled at the same time as other downlink signaling, such as paging physical downlink control channel (PDCCH)

signaling, PDCCH signaling to schedule system information, system information, or an SSB. This may affect reception of the downlink signaling, and the network may attempt retransmission if the downlink signaling contains critical information, such as an SSB or a system information block (SIB).

The present disclosure provides techniques for PEI repetition, such as to avoid or resolve scheduling conflicts between PEI and other scheduled communications. For example, a wireless communications system may implement priorities for PEI signaling and downlink signaling which may collide with PEI signaling. A UE may be configured with the priorities, and the UE may determine whether to receive the PEI signaling or the downlink signaling if one or more PEI repetitions collide with the downlink signaling. In some examples, if one or more PEI repetitions are scheduled to collide with downlink signaling, the base station may shift transmission of the PEI repetitions to a first non-colliding symbol. Alternatively, the base station may refrain from transmitting PEI repetitions during PEI occasion which are scheduled to collide with downlink signaling or uplink symbol periods, or both.

In some examples, the network may indicate a number of PEI repetitions associated with a paging occasion to a UE. For example, the network may indicate a maximum number of repetitions for PEI for a paging occasion via a SIB. However, the network may not transmit the maximum number of PEI repetitions, such as due to scheduling collisions or resource availability. In some cases, the network may indicate a number of PEI occasions or transmitted PEI repetitions (e.g., actually transmitted PEI repetitions), or both, to the UE. Some additional techniques are described herein, such as configuring subsets of blind detection hypotheses for PEI repetitions, configuring a PEI monitoring window for transmitting PEI repetitions, and PEI signaling monitoring determinations, among others.

Aspects of the disclosure are initially described in the context of wireless communications systems. Aspects of the disclosure are further illustrated by and described with reference to apparatus diagrams, system diagrams, and flowcharts that relate to techniques for PEI repetition.

FIG. 1 illustrates an example of a wireless communications system 100 that supports techniques for PEI repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, a UE 115 may operate in an RRC idle mode or an RRC inactive mode, each of which may be referred to as an inactive state or a sleeping state, until the UE 115 has data to transmit or receive (e.g., or another operation to perform via a network connection). The UE 115 may communicate with the network by establishing an RRC connection and transitioning to an RRC connected mode, which may be referred to as an active state. The UE 115 may be configured with a DRX cycle for paging (e.g., a paging cycle), which may indicate how frequently the UE 115 may monitor a paging channel for paging from the network. The UE 115 may monitor for paging according to the DRX cycle while operating in the inactive state to reduce power consumption, and a paging message may indicate whether the UE 115 is to transition to an active state to receive data.

In some cases, the network may transmit a PEI to the UE 115 to indicate whether a subsequent paging occasion includes a scheduled paging message for the UE 115. For example, a base station 105 may transmit a PEI to indicate whether the UE 115 is paged before the paging opportunity. Some UEs 115 may be configured into sub-groups for PEI signaling, where a PEI transmission indicates groups of UEs 115 to wake up for a paging occasion. PEI techniques may improve power savings at a UE 115, such as by reducing unnecessary paging PDSCH decoding, enabling a UE 115 to skip SSB reception for tracking loop updates for PDSCH decoding, and reducing wakeup duration when PEI is place close to an SSB.

In some examples, a base station 105 may transmit repetitions of a PEI in multiple PEI occasions. Transmitting repetitions of PEI may provide a higher SNR, account for different UE implementations, or account for potential LBT failure in unlicensed spectrum. When PEI repetition is configured, some of the repetitions may be scheduled to collide with other signaling. For example, one or more of the PEI repetitions may be scheduled at the same time as other downlink signaling, such as paging PDCCH signaling, PDCCH signaling to schedule system information, system information, or an SSB. This may affect reception of the downlink signaling, and the network may attempt retransmission if the downlink signaling contains critical information, such as an SSB or a SIB.

In some cases, PEI may be implemented with UE grouping to provide additional efficient power savings. For example, a UE 115 may be included in a sub-group of UEs 115 which receive a same PEI. A base station 105 may transmit a PEI for the sub-group of UEs 115 to indicate data for one or more UEs 115 in the sub-group.

In some cases, PEI repetition may provide higher SNR. For example, a cell size of a base station 105 may be large, and the base station 105 may serve UEs 115 with limited coverage or capabilities (e.g., reduced capability UEs 115). Higher SNR, or SNR boosting, may enable UEs 115 to receive the PEI and perform efficient wakeup for a paging occasion.

In some cases, PEI repetitions may be transmitted at multiple occasions or multiple locations to account for different UE implementations and SNR conditions. Different UEs 115 may process different quantities of SSBs to perform a tracking loop update. For example, a first UE 115 may process one SSB to perform a tracking loop update, while other UEs 115 may process two or more SSBs to perform a tracking loop update. Providing different instances and locations of PEI within time-frequency resources may enable different UEs 115 to process different quantities of SSBs. For example, decoding an earlier PEI may enable a first UE 115 to determine whether the first UE 115 should process multiple SSBs, where decoding a later PEI may enable a second UE 115 to remain in a lower power state for longer.

In some cases, PEI repetition may be implemented in a shared or unlicensed radio frequency spectrum band. Transmitting PEI repetitions may increase a likelihood of successful PEI transmission and reception in the event of LBT failure in these radio frequency spectrum bands.

When PEI repetition is configured, some transmission of the PEI may collide with other channels or signals. For example, some PEI repetitions may collide with other downlink signals (e.g., legacy downlink channels and signals), or some PEI repetitions may be schedule for uplink-directed symbol periods in a slot. In some cases, the network may transmit the downlink channel or signal if the downlink channel or signal includes critical information (e.g., an SSB or a SIB), which may result in delayed data communication at the UE 115. The wireless communications system 100, among wireless communications systems described herein, may implement techniques to resolve scheduling conflicts for PEI repetition.

For example, a UE 115 may be configured to either prioritize receiving the PEI signaling or to prioritize receiving the downlink signaling. Additionally, or alternatively, PEI occasions for the PEI repetitions may be shifted (e.g., delayed) to a first non-colliding symbol period (e.g., delayed until after the downlink signaling ends). In some examples, the UE 115 may be indicated a number of actually transmitted PEI repetitions, such as if the number of actually transmitted PEI repetitions is different from a maximum number of PEI repetitions that can be transmitted for one paging occasion. In some cases, a UE 115 may be configured with a subset of blind decoding hypotheses for PEI decoding. For example, the base station 105 may transmit PEI signaling according to subsets of PEI occasions. If the base station 105 does not transmit PEI signaling in one PEI occasion of a subset of PEI occasions, the base station 105 may not transmit PEI signaling in any PEI occasion of that subset of PEI occasions. Additionally, or alternatively, the UE 115 may be configured with a PEI window. The base station may transmit PEI signaling in PEI occasions within the PEI window, and the UE 115 may monitor for the PEI signaling within the PEI window.

Figure 2:
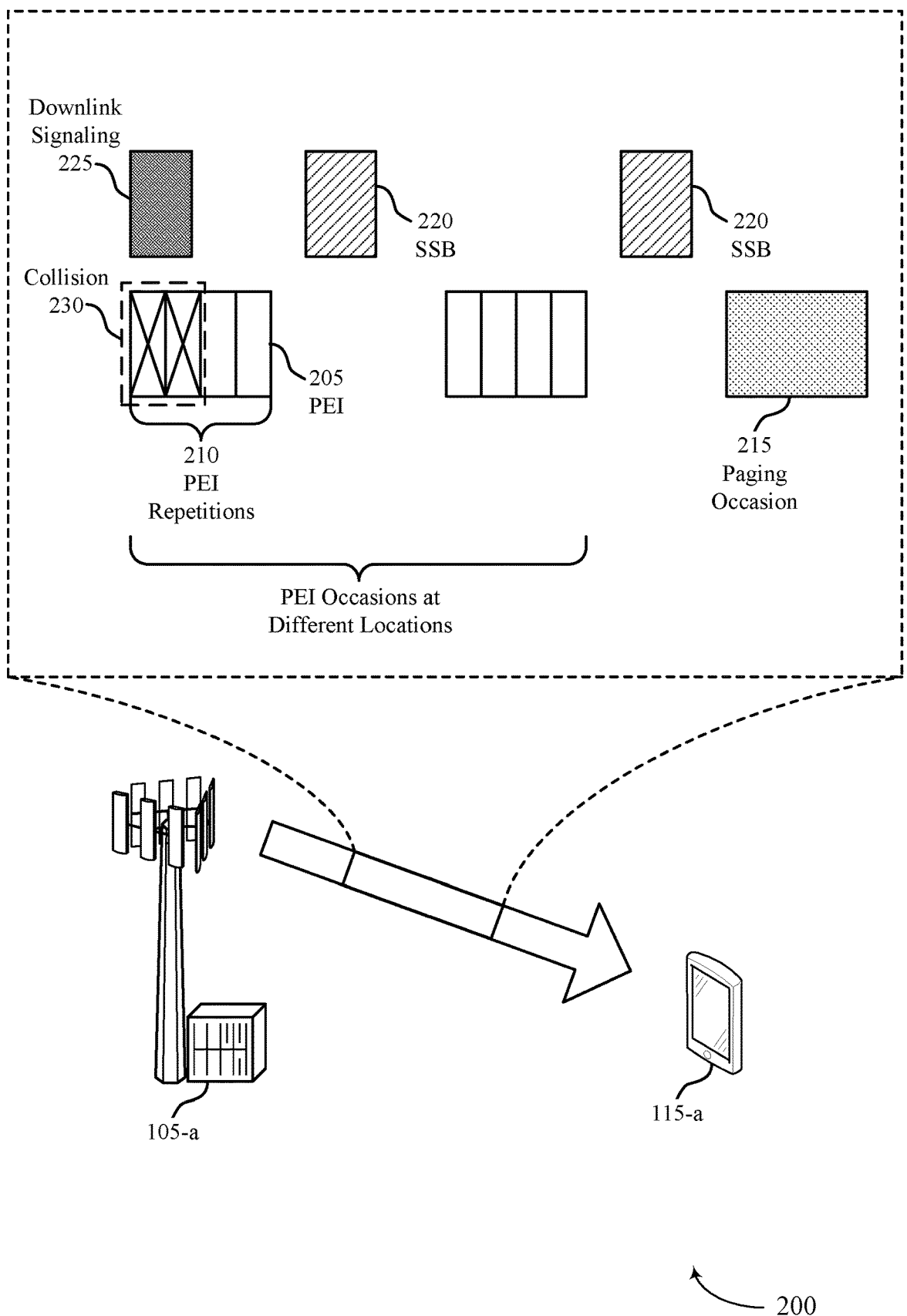
FIG. 2 illustrates an example of a wireless communications system that supports techniques for PEI repetition in accordance with aspects of the present disclosure.

FIG. 2 illustrates an example of a wireless communications system 200 that supports techniques for PEI repetition in accordance with aspects of the present disclosure. The wireless communications system 200 may include a UE 115-*a* and a base station 105-*a*, which may be respective examples of a UE 115 and a base station 105 as described with reference to FIG. 1.

In some cases, to reduce power usage, UE 115-*a* may operate in an RRC inactive or RRC idle mode, until UE 115-*a* is scheduled for a data transmission. When base station 105-*a* has data for UE 115-*a*, base station 105-*a* may transmit a paging message to UE 115-*a*, and UE 115-*a* may switch from the inactive mode to an active mode, such as an RRC connected mode. UE 115-*a* may monitor for paging messages during a paging occasion 215 according to a configured DRX cycle of UE 115-*a*.

In some cases, base station 105-*a* may transmit a PEI 205 to indicate whether UE 115-*a* is paged before the paging occasion. For example, if UE 115-*a* receives a PEI 205 before the paging occasion 215, UE 115-*a* may wake up and perform PDSCH decoding during the paging occasion 215. If UE 115-*a* does not receive a PEI 205 before the paging occasion 215, UE 115-*a* may remain in the sleeping mode and skip performing PDSCH decoding during the paging occasion 215.

The wireless communications system 200 may support techniques for PEI repetition. For example, base station 105-*a* may transmit a set 210 of multiple repetitions or instances of a PEI 205. The PEIs 205 in the set 210 may be transmitted during PEI occasions, during which a PEI 205 may be transmitted by base station 105-*a*. PEI occasions may be configured at multiple different occasions prior to the paging occasion 215. In some cases, each PEI 205 in the set 210 may be a repetition of a same PEI, such as PEIs associated with a group or sub-group of UEs 115. In some cases, base station 105-*a* may transmit an indication of a configuration for PEI to UE 115-*a*, such as via system information or RRC signaling. The configuration for PEI may indicate, for example, PEI occasion configurations, a UE sub-group configuration, etc.

Upon detecting a PEI 205 from the set 210, UE 115-*a* may monitor for downlink signaling and process the downlink signaling to obtain update tracking loops to decode a paging message during the paging occasion 215. For example, UE 115-*a* may process one or more SSBs 220 or reference signals such as CSI-RS or tracking reference signal (TRS), or a combination thereof. In some cases, UE 115-*a* may perform a tracking loop update based on the SSBs 220.

In some cases, one or more repetitions of the PEI 205 in the set 210 may be scheduled to collide with other signaling. For example, two PEI 205 of the set 210 may be scheduled to overlap, or collide, with downlink signaling 225. In some other examples, a PEI 205 may be scheduled during an uplink symbol of a slot. Therefore, UE 115-*a* or base station 105-*a*, or both, may identify a scheduling conflict or a collision 230 for one or more PEIs 205.

In an example, the downlink signaling 225 may be an example of an SSB 220 or a SIB. The downlink signaling 225 may be transmitted on a downlink channel such as PDCCH or PDSCH. In some cases, the downlink signaling 225 may include or be an example of paging PDCCH, scheduling PDCCH for a SIB, an SSB, SIB PDSCH, a TRS for idle or inactive mode UEs 115, or any combination thereof. If the PEI 205 collides with urgent or critical downlink signaling, base station 105-*a* may retransmit the downlink signaling 225. This may delay reception of the downlink signaling 225 containing urgent or critical information for some devices in the wireless communications system 200.

The wireless communications system 200, and wireless communications systems described herein, may support techniques for PEI repetition. For example, devices the wireless communications system 200 may implement techniques to avoid or resolve a scheduling conflict, transmission conflict, or collision, such as the collision 230.

In an example, the wireless communications system may support techniques to define or configure priorities between PEI signaling and downlink transmissions or channels, such as a PEI 205 and the downlink signaling 225. UE 115-*a* may determine whether to receive a PEI 205 or the downlink signaling 225 according to the priority, or priorities, of the PEI 205 and the downlink signaling 225. In some cases, different types of signaling may have different priorities. For example, paging PDCCH, scheduling PDCCH for a SIB, SSBs, SIB PDSCH, and TRS for idle or inactive mode UEs 115 may each be configured with a priority. For example, UE 115-*a* may be configured to receive a PEI 205 over an SSB 220 according to the configured priority for the SSB 220 in some examples, or UE 115-*a* may be configured to receive a TRS over a PEI 205 according to the configured priority for the TRS.

In some cases, PEI transmission priority may be configured for each channel, broadcast channel, or signal separately. For example, PEI scheduling (e.g., according to techniques described herein), or PEI transmission priority, may be configured differently for a collision with a TRS than a collision with PDSCH. In an example, the set 210 of PEI 205 may be shifted for a collision with TRS (e.g., as described in further detail with reference to FIG. 3), where a portion of the set 210 of PEI 205 may not be transmitted if the set 210 overlaps with PDSCH. This is one possible example of different scheduling techniques for different types of scheduling conflicts or collisions, and other scheduling techniques may be applied or configured for these and other types of scheduling conflicts or collisions.

In another example, UE 115-*a* may identify the scheduling conflict. For example, UE 115-*a* may identify the collision 230 prior to the collision 230 occurring. For example, the collision 230 may be between repetitions of the PEI 205 and broadcast channels or broadcast signals. UE 115-*a* may know, or be configured with, a periodicity or scheduling for the broadcast channels or broadcast signals, and UE 115-*a* may determine that one or more PEI occasions are scheduled to collide with the broadcast channels or broadcast signals. Additionally, or alternatively, base station 105-*a* may transmit an explicit indication of the collision 230 to UE 115-*a*. In some cases, if UE 115-*a* is aware of the scheduling conflict, UE 115-*a* may detect PEI 205 in one or more remaining PEI occasions of the set 210 where the collision 230 does not occur. For example, if the downlink signaling 225 collides with a first two of four PEI 205 in the set 210, UE 115-*a* may monitor for PEI 205 during the last two PEI occasions in the set 210 which do not collide with the downlink signaling 225.

In some examples, base station 105-*a* may refrain from transmitting PEI at the colliding symbols. For example, if the downlink signaling 225 collides with the first two PEI occasions of the set 210, base station 105-*a* may not transmit PEI during the first two PEI occasions. Base station 105-*a* may still transmit the last two PEI 205 of the set 210 during the two, non-colliding PEI occasions.

In some cases, base station 105-*a* may indicate a number of PEI occasions associated with a paging occasion 215 or associated with a set 210 of PEI repetitions. For example, UE 115-*a* may receive a PEI configuration indicating a maximum number of repetitions for PEI 205 associated with a paging occasion 215. In some cases, base station 105-*a* may transmit indication of the maximum number of repetitions for PEI 205 associated with a paging occasion 215 via system information, such as in a SIB. For example, prior to the paging occasion 215, base station 105-*a* may be able to transmit up to four repetitions of a PEI 205 in a set 210 of PEI occasions.

In some cases, the actual number of transmitted PEI repetitions and transmission occasions for PEI for a paging occasion 215 may be different than the configured maximum number of repetitions. For example, due to a scheduling conflict such as the collision 230, base station 105-*a* may not transmit the PEI 205 during each PEI occasion of the set 210 of PEI occasions.

UE 115-*a* may determine the number of actually transmitted PEI repetitions and PEI occasions for the paging occasion 215. In some cases, base station 105-*a* may transmit an indication of the number of actually transmitted PEI repetitions and PEI occasions. For example, base station 105-*a* may indicate the number of actual PEI transmission via system information, such as in a SIB. Additionally, or alternative, a previous PEI or paging PDCCH signal may indicate a PEI repetition quantity or PEI repetition pattern. For example, paging PDCCH signaling in a previous paging occasion may indicate the number of actually transmitted PEI repetitions for the paging occasion 215. In some cases, the PEI repetition quantity or PEI repetition pattern may be indicated for a UE sub-group. In some cases, the PEI repetition pattern may be an example of a blind detection hypotheses pattern or a pattern for repetition subsets as described in more detail with reference to FIG. 4.

In some cases, UE 115-a may determine a number of actually transmitted PEI repetitions and PEI occasions based on UE blind detection. For example, UE 115-a may be configured with blind detection patterns to reduce a processing load at UE 115-a to detect the PEI 205. UE 115-a may perform blind detection at a PEI occasion of the set 210 of PEI occasions. UE 115-a may be configured with multiple different patterns of PEI occasions, where PEI may be transmitted in PEI occasions of one or more of the different patterns. For example, PEI occasions may be configured at certain locations or resources for the different patterns. If, for example, UE 115-a detects a PEI 205 at a PEI occasion corresponding to a first pattern, UE 115-a may determine that PEI are transmitted in PEI occasions according to the first pattern. If UE 115-a does not detect the PEI 205 at the PEI occasion corresponding to the first pattern, UE 115-a may determine that the PEI 205 are not transmitted at any of the PEI occasions corresponding to the first pattern. An example of this technique may be described with more detail with reference to FIG. 4. In some cases, the number of actually transmitted PEI repetitions and PEI occasions may be based on a blind detection capability of UE 115-a. Additionally, or alternatively, the number of actually transmitted PEI repetitions and PEI occasions may be based on a capability of another UE 115 in the same sub-group as UE 115-a.

In some cases, the transmission conflict may be unknown to UE 115-a. For example, the scheduling conflict may be based on the collision 230 between one or more PEI transmissions and the downlink signaling 225 carrying UE-specific PDCCH or PDSCH for connected mode UEs 115. Additionally, the scheduling conflict may arise from UE 115-a or base station 105-a, or both, failing to gain access to the channel medium when performing an LBT procedure (e.g., an LBT failure).

For example, UE 115-a may not be aware of the scheduling conflict, and UE 115-a may not detect a PEI 205 at selected occasions due to the scheduling conflict (e.g., during a first PEI occasion or a second PEI occasion of the set 210 of PEI occasions). In some examples, if UE 115-a does not detect PEI 205 during the selected PEI occasions, UE 115-a may not process any remaining PEI occasions. For example, UE 115-a may refrain from processing or performing detection during the third or fourth PEI occasions of the set 210 of PEI occasions. In some other examples, UE 115-a may continue to process the remaining PEI occasions until either the PEI 205 is detected or all PEI occasions associated with the set 210 of PEI occasions or the paging occasion 215 are detected.

In some examples, UE 115-a may be configured with multiple repeated segments, or chunks, of PEI occasions. For example, UE 115-a may be configured with multiple repeated segments to provide a higher likelihood of PEI detection while operating in an unlicensed radio frequency spectrum band. Each segment may include one or more PEI occasions, where one occasion has one repetition of the PEI 205 if transmitted. If UE 115-a does not detect the PEI 205 within one segment, UE 115-a may continue performing PEI detection during remaining segments as long as UE 115-a has multiple (e.g., more than one) remaining segments scheduled. UE 115-a may cease PEI detection when UE 115-a has one remaining segment or after UE 115-a detects the PEI 205 within one of the segments. In some examples, base station 105-a may include an indicator (e.g., a one bit indicator) in a PEI 205 or in paging PDCCH signaling to indicate for UE 115-a to refrain from monitoring PEI occasions for paging in the paging occasion 215. In some examples, one or more of these techniques may be implemented by a UE 115 for a beam tracked by the UE 115 or across beams.

Figure 3:
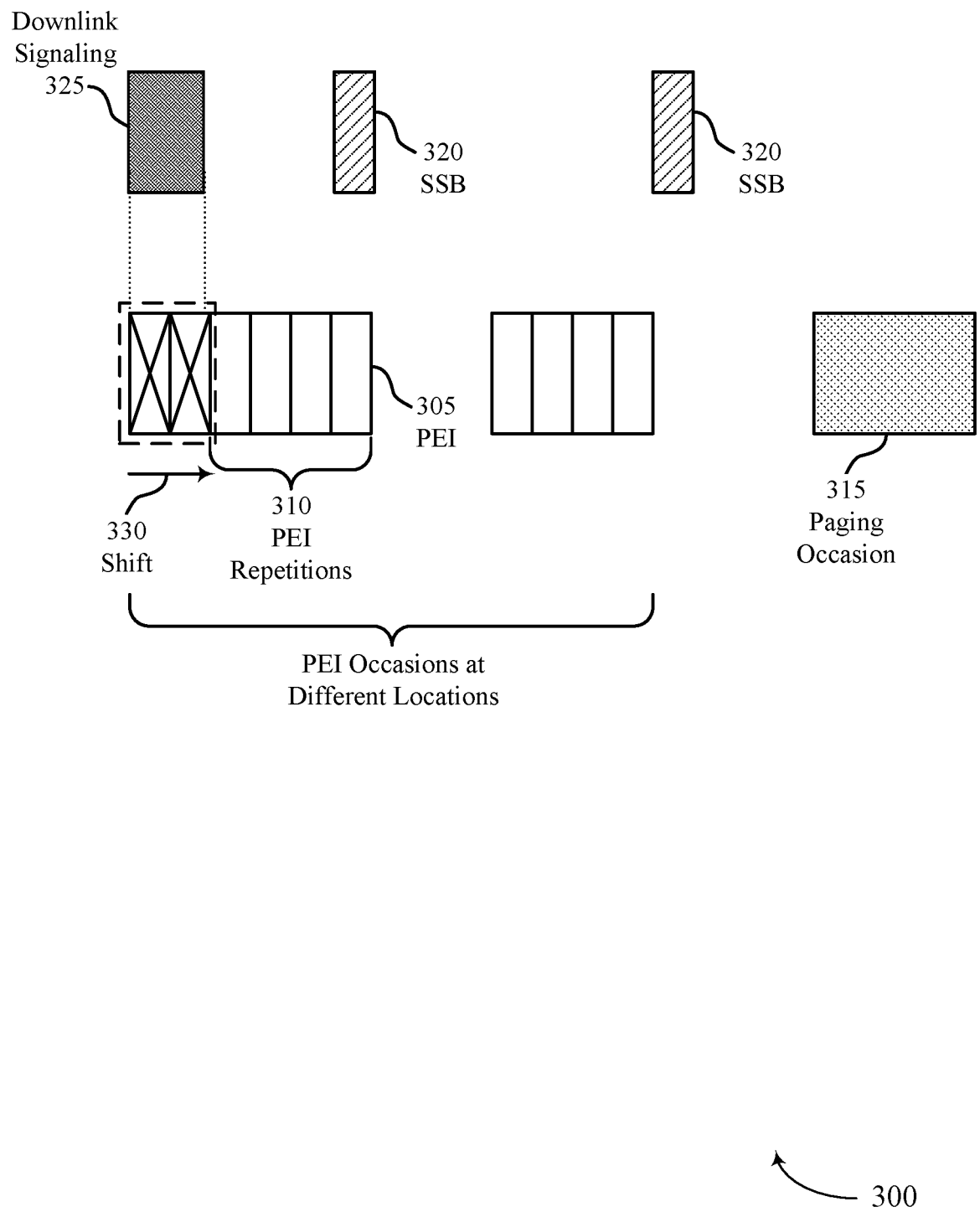
FIG. 3 illustrates an example of a PEI occasion shift configuration that supports techniques for PEI repetition in accordance with aspects of the present disclosure.

FIG. 3 illustrates an example of a PEI occasion shift configuration 300 that supports techniques for PEI repetition in accordance with aspects of the present disclosure. The PEI occasion shift configuration 300 may be implemented by a UE 115 or base station 105, or both, configured for PEI repetition techniques described herein.

A base station 105 may transmit multiple repetitions of a PEI 305 to indicate that a UE 115 or a group of UEs 115 are configured for a paging message in a paging occasion 315. Upon detecting the PEI 305, a UE 115 may process signaling (e.g., one or more SSBs 320, reference signals, or both) to update a tracking loop or obtain channel quality information (CQI), or both, and prepare to perform decoding during the paging occasion 315 to receive the paging message.

The repetitions of the PEI 305 may be transmitted in a set of PEI occasions 310. In some cases, there may be a scheduling conflict for one or more originally scheduled repetitions of the PEI 305. For example, at least a portion of the set of PEI occasions 310 may be scheduled to collide with other signaling or channels, such as downlink signaling 325. In some cases, the scheduling conflict may be based on a collision with other signaling, or the PEI occasions 310 may overlap or be scheduled for uplink-configured symbol periods in a slot.

In some cases, if the set of PEI occasions 310 are scheduled to collide with other signaling, the set of PEI occasions 310 may be shifted (e.g., by a shift 330) to the next non-colliding symbol. For example, the set of PEI occasions 310 may include four PEI occasions, and two of the PEI occasions may be scheduled to overlap (e.g., collide) with the downlink signaling 325. Instead of transmitting the PEI 305 during the originally configured set of PEI occasions 310, the base station 105 may delay the set of PEI occasions 310 (e.g., and transmission of the PEI 305) by the shift 330. For example, the set of PEI occasions 310, and transmission of the PEI 305, may start (at the earliest) a first symbol period after the downlink signaling ends.

In an example, one or more PEI occasions may collide with a UE-specific channel or UE-specific signaling for a UE 115 operating in a connected mode. A UE 115 operating in an inactive mode or idle mode may not sense or detect the signaling for the connected mode UE 115 before the scheduling conflict occurs. Therefore, the base station 105 may employ the shift 330 to transmit the PEI 305 in a full set of shifted PEI occasions (e.g., the set of PEI occasions 310 delayed by the shift 330). In some cases, if a UE 115 is scheduled for multiple sets of PEI occasions prior to a paging occasion 315, the base station 105 may individually shift sets of PEI occasions based on scheduling conflicts. For example, as illustrated, the base station 105 may shift a first set of PEI occasions which collide with the downlink signaling 325, and the base station 105 may not shift another set of PEI occasions which either do not have a scheduling conflict or collision or have a different type of scheduling conflict.

As described herein, in some other examples, the base station 105 may instead refrain from transmitting the PEI 305 during the colliding symbols. In some cases, whether the base station 105 performs the PEI shift or whether the base station 105 does not transmit the PEI 305 may be configured for different types of scheduling conflicts. For example, the base station 105 may shift the set of PEI occasions 310 for some types of scheduling conflicts or downlink signaling, and the base station 105 may refrain from transmitting PEI during the colliding portion of the set of PEI occasions 310 for other types of scheduling conflicts or other types of downlink signaling. For example, the base station 105 may shift the set of PEI occasions 310 if the set of PEI occasions 310 are scheduled during an uplink symbol period, and the base station 105 may cancel PEI transmission during a PEI occasion which overlaps with an uplink symbol period.

Figure 4:
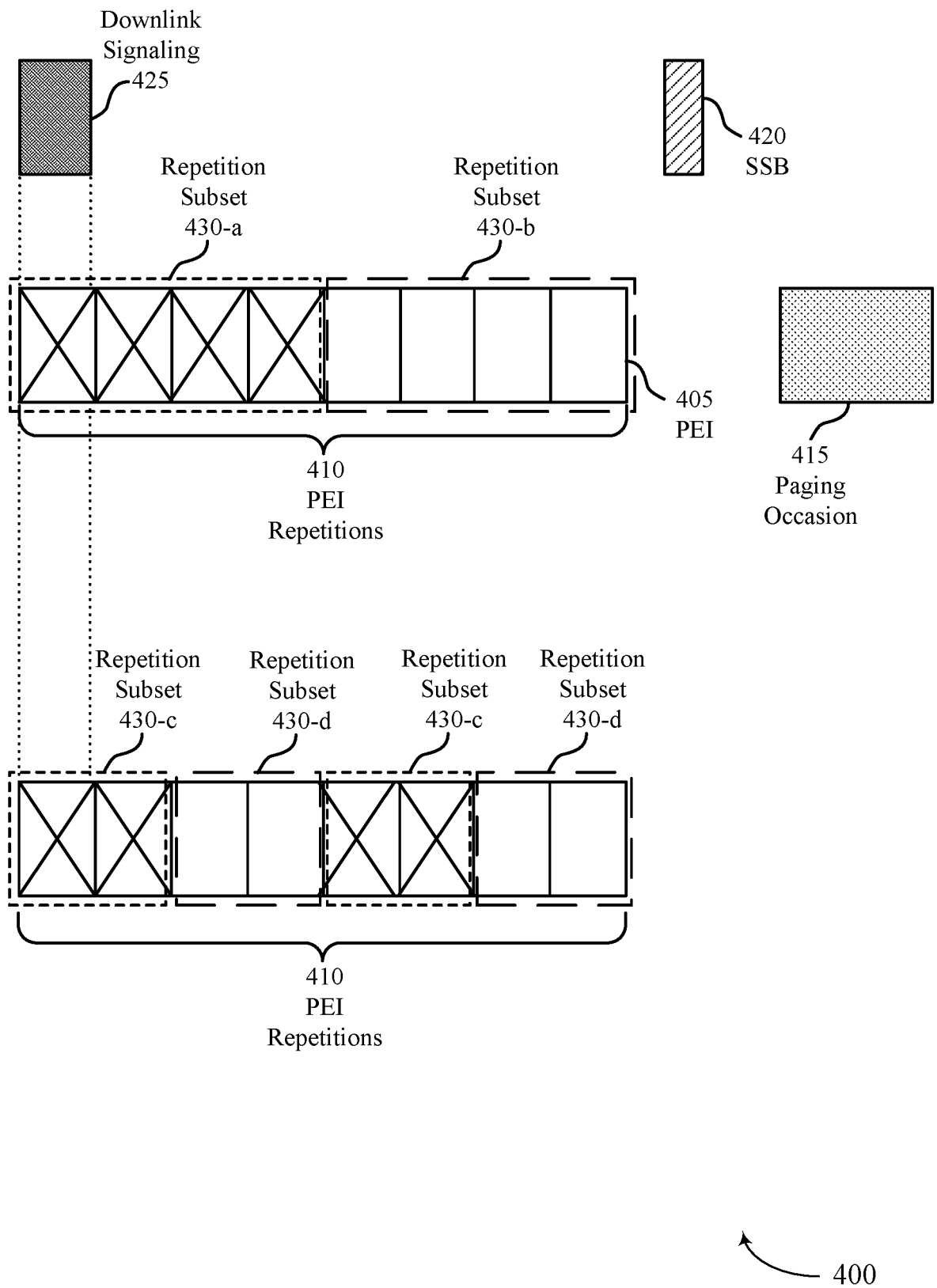
FIG. 4 illustrates an example of a blind decoding subset configuration that supports techniques for PEI repetition in accordance with aspects of the present disclosure.

FIG. 4 illustrates an example of a blind decoding subset configuration 400 that supports techniques for PEI repetition in accordance with aspects of the present disclosure. The blind decoding subset configuration 400 may be implemented by a UE 115 or base station 105, or both, configured for PEI repetition techniques described herein.

A base station 105 may transmit multiple repetitions of a PEI 405 to indicate that a UE 115 or a group of UEs 115 are configured for a paging message in a paging occasion 415. Upon detecting the PEI 405, a UE 115 may process signaling (e.g., one or more SSBs 420, reference signals, or both) to obtain CQI and prepare to perform decoding during the paging occasion 415 to receive the paging message.

The repetitions of the PEI 405 may be transmitted in a set of PEI occasions 410. In some cases, there may be a scheduling conflict for one or more repetitions of the PEI 405. For example, at least a portion of the set of PEI occasions 410 may be scheduled to collide with other signaling or channels, such as downlink signaling 425. In some cases, the scheduling conflict may be based on a collision with other signaling, or the PEI occasions 410 may overlap or be scheduled during uplink-configured symbol periods in a slot.

In some cases, due to a collision or scheduling conflict, a base station 105 may transmit fewer PEI repetitions than a maximum number of PEI repetitions. For example, the base station 105 may transmit a SIB indicating a maximum number of repetitions for the PEI 405 for each paging occasion 415. However, due to a scheduling conflict, the base station 105 may transmit fewer repetitions of the PEI 405 than the maximum number of repetitions. A UE 115 or a base station 105, or both, may implement techniques to determine how many repetitions of a PEI 405 are transmitted for a paging occasion 415 and, in some cases, patterns for performing blind decoding to obtain the PEI 405.

In some cases, the base station 105 may transmit an indication of the number of actually transmitted PEI repetitions. For example, the base station 105 may transmit a SIB including an indication of a number of actually transmitted PEI repetitions for a paging occasion 415. Additionally, or alternatively, the base station 105 may indicate the number of actually transmitted PEI repetitions via PEI signaling or paging PDCCH signaling, or both. Indicating the number of PEI repetitions through PEI signaling or paging PDCCH signaling may indicate a PEI repetition number of a group or sub-group of UEs 115 configured to receive common PEI signaling. In some cases, the PEI repetition number may be indicated through PEI signaling or paging PDCCH signaling if the base station 105 does not frequently update the PEI repetition number (e.g., the base station 105 expects or schedules few collisions or scheduling conflicts).

In some examples, the number of actually transmitted PEI repetitions may be based on UE blind detection. For example, the UE 115 may be configured with blind detection patterns to detect the PEI 405. A scheduling conflict, such as a collision between the PEI 405 and the downlink signaling 425 (e.g., UE-specific channels or signals or connected mode UEs 115) may generate different patterns, each corresponding to blind detection hypotheses of the actual transmission of the PEI 405. Configuring blind detection patterns may reduce processing strain for the UE 115 to detect the PEI 405. For example, configuring the different patterns may limit a total number of hypotheses at the UE 115 to obtain the PEI 405. By reducing the processing strain at the UE 115, the UE 115 may more efficiently combine PEI repetitions, such as for SNR boosting.

In an example, a UE 115 may be configured a maximum number of PEI repetitions, which may be transmitted in a set of PEI occasions 410. In some cases, the UE 115 may also determine a number of actually transmitted PEI repetitions, such as through signaling from the base station 105 or according to a UE blind decoding capability. For example, the UE 115 may be configured with a maximum number of eight PEI repetitions, and the UE 115 may determine there are four actually transmitted PEI repetitions for this paging occasion 415.

The UE 115 may also be configured with one or more PEI repetition subsets 430. A PEI repetition subset 430 may correspond to one possible blind detection hypothesis for the PEI 405 within the set of PEI occasions 410. The different patterns of hypotheses or PEI repetition subsets 430 may be configured at the UE 115, such as through SIB signaling, paging signaling, or semi-static signaling to the UE 115.

The UE 115 may perform blind decoding according to the PEI repetition subsets 430. For example, if the UE 115 does not detect PEI within one PEI occasion of a PEI repetition subset 430, the UE 115 may determine that the base station 105 did not transmit the PEI 405 during that PEI repetition subset 430. The UE 115 may refrain from performing blind decoding during other PEI occasions of that PEI repetition subset 430 and may attempt blind decoding during a PEI occasion of another PEI repetition subset 430. Configuring the patterns or PEI repetition subsets 430 may reduce a number of PEI transmission patterns which are checked or decoded by the UE 115. This may reduce processing strain at the UE 115, as the UE 115 may perform fewer blind decoding procedures if the UE 115 can determine that the PEI 405 is not transmitted during an occasion corresponding to a PEI repetition subset 430.

In an example, a UE 115 may be configured with PEI repetition subset 430-a and PEI repetition subset 430-b. The UE 115 may attempt to obtain the PEI 405 during a PEI occasion of PEI repetition subset 430-a, but the UE 115 may not detect the PEI 405. The UE 115 may determine that the base station 105 did not transmit the PEI during any occasion of PEI repetition subset 430-a, and the UE 115 may refrain from performing PEI decoding during any other PEI occasion of the PEI repetition subset 430-a. The UE 115 may then attempt to decode the PEI 405 during an occasion of PEI repetition subset 430-b, and the UE 115 may receive the PEI 405. The UE 115 may determine that the base station 105 transmits the PEI during PEI repetition subset 430-b. In some cases, the UE 115 may decode the PEI 405 during additional PEI occasions of PEI repetition subset 430-b, such as for SNR boosting.

The patterns for the PEI repetition subset 430 may be configurable by a base station 105 or configured for a wireless communications system, or both. In some cases, PEI repetitions may be transmitted on consecutive occasions. For example, for PEI repetition subset 430-a and PEI repetition subset 430-b, the PEI 405 may be transmitted in consecutive groups (e.g., without a gap between the PEI signaling within a PEI repetition subset 430). Additionally, or alternatively, other patterns may be used. For example, PEI repetition subset 430-c and PEI repetition subset 430-d may be configured, where the PEI repetition subsets 430 switch between each other within the set of PEI occasions 410. If a UE 115 does not detect the PEI 405 during a first portion of the PEI repetition subset 430-c, the UE 115 may refrain from performing PEI decoding during a second portion of the PEI repetition subset 430-c. In some cases, the number of transmitted PEI repetitions may be a subset of one to the configured maximum number of repetitions for the paging occasion 415. In other examples or implementations, a UE 115 may be configured with a different number of PEI repetition subsets 430, different quantities of PEI repetitions per PEI repetition subset 430, different patterns for PEI occasions for the PEI repetition subsets 430, a different maximum number of PEI repetitions for a paging occasion 415, or any combination thereof.

Figure 5:
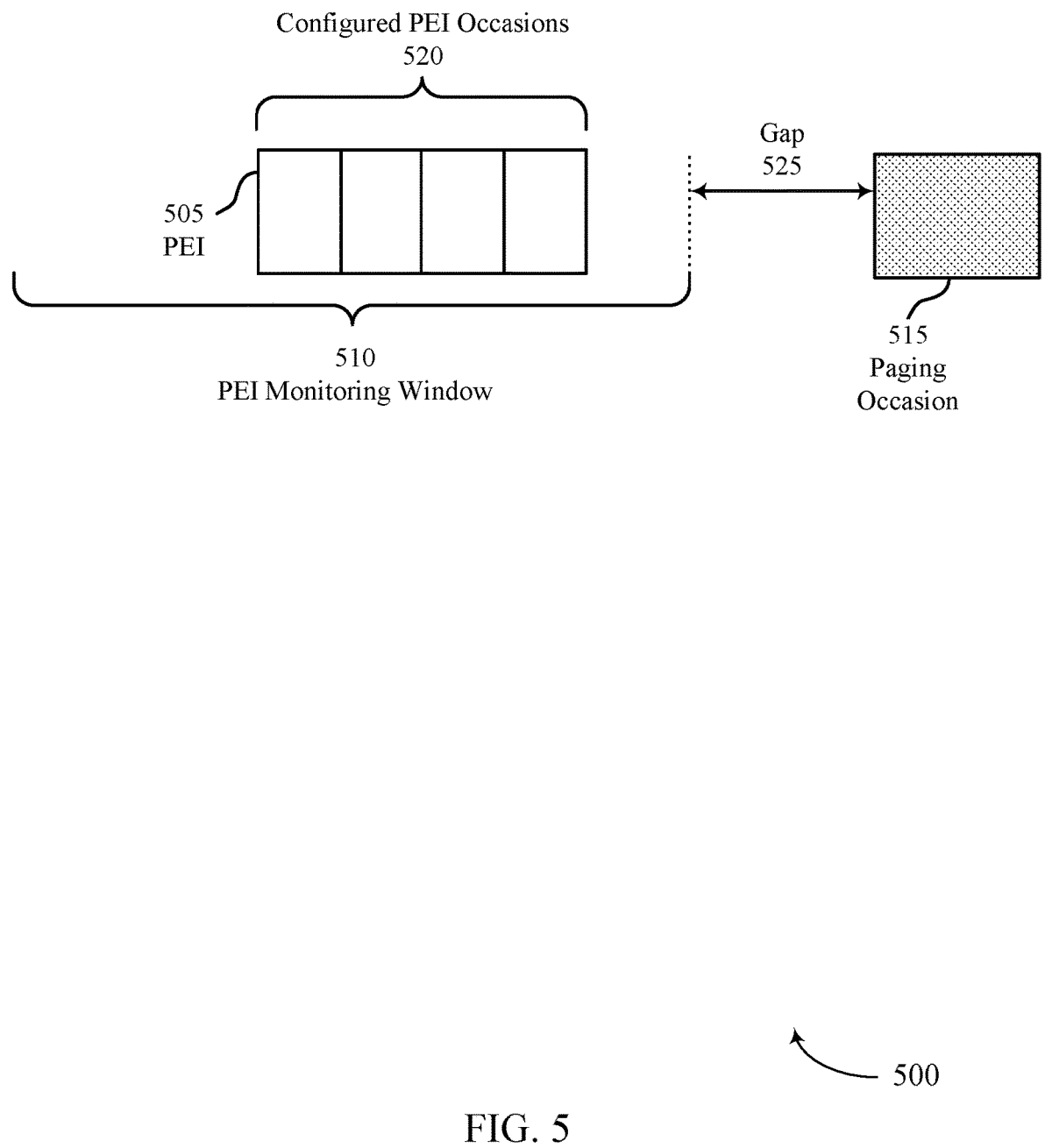
FIG. 5 illustrates an example of a PEI window configuration that supports techniques for PEI repetition in accordance with aspects of the present disclosure.

FIG. 5 illustrates an example of a PEI window configuration 500 that supports techniques for PEI repetition in accordance with aspects of the present disclosure. The PEI window configuration 500 may be implemented by a UE 115 or base station 105, or both, configured for PEI repetition techniques described herein.

A base station 105 may transmit multiple repetitions of a PEI 505 to indicate that a UE 115 or a group of UEs 115 are configured for a paging message in a paging occasion 515. Upon detecting the PEI 505, a UE 115 may process signaling (e.g., one or more SSBs, reference signals, or both) to obtain CQI and prepare to perform decoding during the paging occasion 515 to receive the paging message.

In some cases, the UE 115 may be configured with a PEI monitoring window 510. For example, a base station 105 may configure the PEI monitoring window 510 for a UE 115, a group of UE 115, or a sub-group of UEs 115 to receive PEI signaling within the PEI monitoring window 510. The PEI monitoring window 510 may provide boundaries for a UE 115 to perform PEI detection. The PEI monitoring window 510 may assists the UE 115 in detecting the PEI 505 by providing a limited set of resources where the PEI 505 may be transmitted. This may further reduce the processing power spent by the UE 115 to detect the PEI 505.

The PEI monitoring window 510 may have a configured length. For example, the PEI monitoring window 510 may span a configurable number of symbol periods or slots, or both. In some cases, the PEI monitoring window 510 may be configured with respect to a gap 525 or offset to a paging occasion 515. In some cases, the gap 525 may be configured such that a UE 115 may process the PEI 505 before a start of the paging occasion 515. For example, a PEI monitoring window 510 may be configured with a length of one slot, and the PEI monitoring window 510 may be configured to be offset (e.g., in the time domain) by a gap 525 of a configured number of slots or symbol periods from the paging occasion 515.

In some cases, a UE 115 may assume that the PEI 505 is transmitted on all PEI occasions within the PEI monitoring window 510. For example, the PEI 505 may be transmitted during each PEI occasion in the PEI monitoring window 510 if the UE 115 is to receive paging signaling in the paging occasion 515. In some cases, the PEI 505 may not be transmitted during PEI occasions where a collision or scheduling conflict occurs within the PEI monitoring window 510. For example, the base station 105 may transmit the PEI 505 during each PEI occasion within the PEI monitoring window 510 as long as resources for the PEI occasion are not occupied or colliding with a higher priority transmission.

In some cases, the window may not include any configured PEI occasion. For example, there may be a mismatch between a PEI occasion configuration (e.g., occasion and offset) and a configuration for the PEI monitoring window 510, such that the configured PEI occasions are not within the PEI monitoring window 510. In some cases, the UE 115 may then process the paging occasion 515 to detect paging PDCCH signaling. In some other examples, the UE 115 may not process the paging occasion 515, and the UE 115 may refrain from monitoring for paging signaling during the paging occasion 515 if there is a configuration mismatch.

In some cases, the PEI monitoring window 510 may be configured for a UE 115 via signaling. For example, in some cases, the PEI monitoring window 510 may be configured via system information (e.g., a SIB), control signaling, or paging signaling, or any combination thereof. Additionally, or alternatively, the PEI monitoring window 510 may be preconfigured for a UE 115 for a wireless communications system. For example, a configuration for the PEI monitoring window 510 may be stored in memory at the UE 115.

Figure 6:
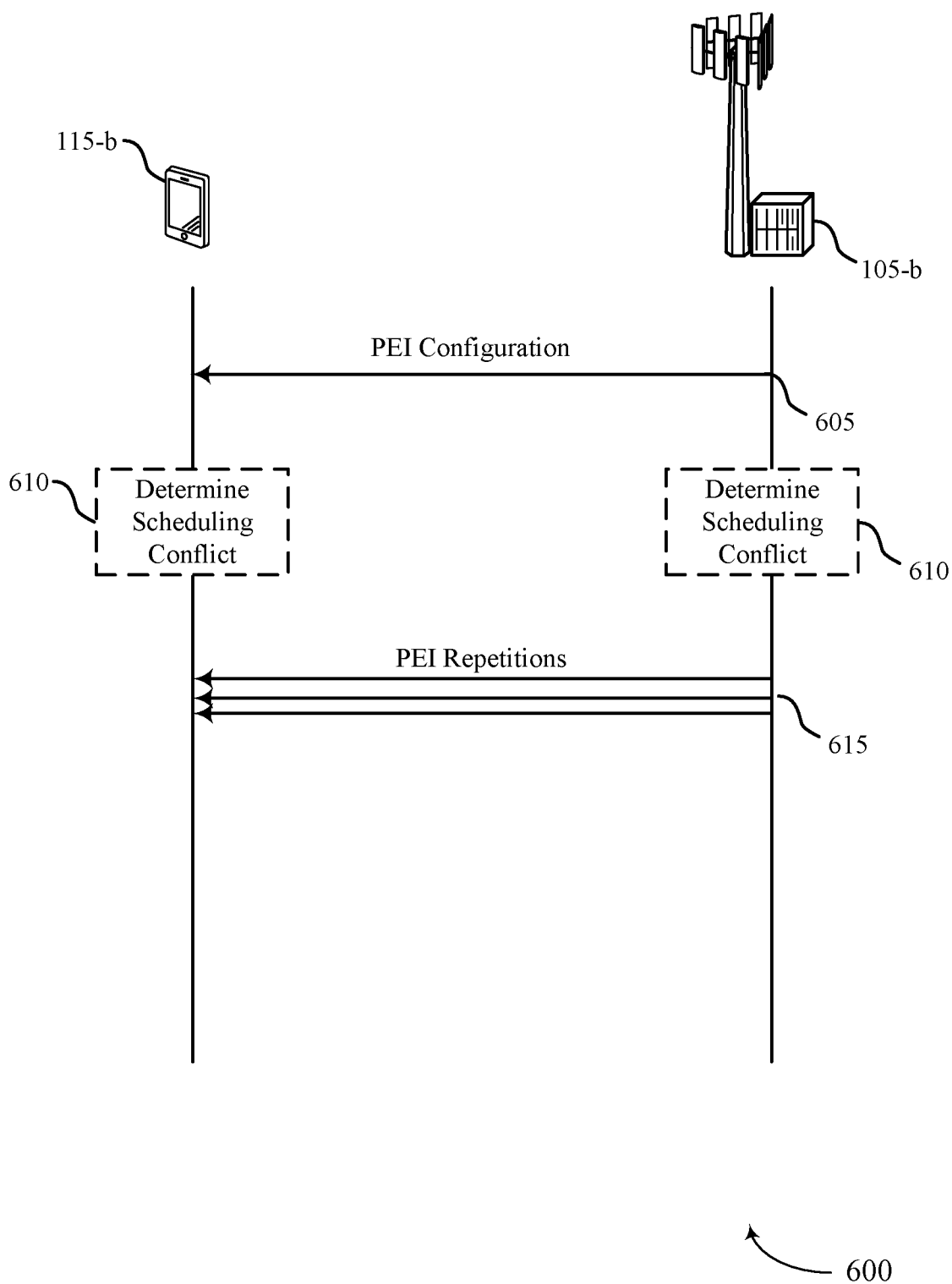
FIG. 6 illustrates an example of a process flow that supports techniques for PEI repetition in accordance with aspects of the present disclosure.

FIG. 6 illustrates an example of a process flow 600 that supports techniques for PEI repetition in accordance with aspects of the present disclosure. The process flow 600 may be implemented by UE 115-b or base station 105-b, or both. UE 115-b may be an example of a UE 115 described herein, and base station 105-b may be an example of a base station 105 described herein. In some cases, some processes or signaling of the process flow 600 may be implemented in different orders than shown. Additionally, or alternatively, some process or signaling shown in the process flow 600 may not be performed, or additional signaling or procedures may be performed.

At 605, UE 115-b may receive signaling indicating a PEI configuration associated with an idle mode or inactive mode for UE 115-b. In some cases, the PEI configuration may include an indication of a PEI repetition scheme for UE 115-b. For example, the PEI configuration may indicate a maximum number of PEI repetitions associated with a paging occasion. Additionally, or alternatively, the PEI configuration may include an indication of a number of actually transmitted PEI repetitions for a paging occasion. In some cases, base station 105-b may transmit an indication of the PEI configuration via control signaling (e.g., RRC signaling), system information (e.g., a SIB), paging signaling (e.g., paging PDCCH, PEI signaling), or any combination thereof. In some cases, the PEI configuration may include one or more blind hypotheses patterns. For example, the PEI configuration may indicate one or more PEI repetition subsets for UE 115-b to perform blind decoding.

In some cases, the PEI configuration may indicate a PEI monitoring window. For example, UE 115-b may receive signaling indicating a configuration for a PEI window associated with a set of multiple PEI occasions. The PEI window may be separated from a paging occasion by a gap in time. In some cases, the PEI window may have a configuration length or duration. For example, the PEI window may span a configured, or configurable, number of symbol periods or slots. In some cases, the PEI configuration may indicate the PEI window duration and the gap, or offset, from a paging occasion.

At 610, UE 115-b or base station 105-b, or both, may determine a scheduling conflict during one or more symbols based on a set of PEI occasions being scheduled for at least the one or more symbol based on the PEI configuration. In some examples, UE 115-b may receive an indication of the scheduling conflict. For example, base station 105-b may transmit the indication of the scheduling conflict to UE 115-b via paging signaling (e.g., paging PDCCH signaling, PEI signaling, etc.). Additionally, or alternatively, UE 115-b may determine the scheduling conflict based on a periodicity or scheduling of downlink signaling, PEI signaling, a slot format configuration, or any combination thereof.

For example, the set of PEI occasions may be scheduled to at least partially overlap with downlink signaling from base station 105-*b*. The downlink signaling may be UE-specific, or dedicated, downlink signaling such as UE-specific PDCCH signaling or UE-specific PDSCH signaling. Additionally, or alternatively, the set of PEI occasions may be scheduled to overlap with broadcast channels or signaling, such as paging PDCCH signaling, scheduling PDCCH for a SIB, an SSB, a SIB, PDSCH signaling carrying a SIB, a TRS (e.g., for idle mode or inactive mode UEs 115), or any combination thereof. In some examples, the scheduling conflict may be based on one or more PEI occasions of the set of PEI occasions being scheduled during an uplink-configured symbol period.

At 615, UE 115-*b* may monitor for at least a portion of the set of PEI occasions based on determining the scheduling conflict. For example, UE 115-*b* may monitor for PEI signaling during the one or more symbols or monitor for downlink signaling during the one or more symbols based on the PEI configuration. In some cases, UE 115-*b* may receive the downlink signaling during the one or more symbols based on the PEI configuration assigning a higher priority to the downlink signaling than the PEI signaling. In some cases, UE 115-*b* may receive the PEI signaling during a remaining portion of the PEI occasions, such as one or more PEI occasions which do not overlap with the downlink signaling.

In some other examples, UE 115-*b* may receive the PEI signaling during the one or more symbols based on the PEI configuration assigning a higher priority to the PEI signaling than the downlink signaling. For example, when PEI signaling collides with some types of downlink signaling, UE 115-*b* may receive the PEI signaling instead of the downlink signaling based on the PEI signaling having a higher priority.

In some cases, base station 105-*b* may not transmit PEI during PEI occasions which have a scheduling conflict. For example, base station 105-*b* may refrain from transmitting PEI during PEI occasions which overlap with certain types of downlink signaling. Additionally, or alternatively, base station 105-*b* may refrain from transmitting PEI signaling during uplink-configured symbol periods.

In some cases, base station 105-*b* may transmit the PEI signaling during a shifted set of PEI occasions based on the scheduling conflict. In some cases, the shifted set of PEI occasions may start at a first symbol period after the scheduling conflict. UE 115-*b* may monitor for the PEI signaling during the shifted set of PEI occasions based on determining the scheduling conflict. For example, the scheduling conflict may be between one or more PEI occasions and broadcast channels or broadcast signaling. UE 115-*b* may determine the scheduling conflict prior to the collision, and UE 115-*b* may determine that the set of PEI occasions have been shifted (e.g., by a shift). Some examples of this technique are described in more detail with reference to FIG. 3.

In some examples, UE 115-*b* may perform blind decoding on a subset of hypotheses to obtain the PEI signaling. For example, UE 115-*b* may be configured with patterns of PEI occasions. UE 115-*b* may perform blind decoding on PEI occasions according to subsets of PEI occasions.

For example, UE 115-*b* may perform blind decoding on a first PEI occasion corresponding to a first subset of PEI occasions. In some cases, UE 115-*b* may ignore remaining PEI occasions corresponding to the first subset of PEI occasions based on the blind decoding on the first PEI occasion being unsuccessful. For example, if base station 105-*b* does not transmit PEI signaling during one PEI occasion of the first subset of PEI occasions, base station 105-*b* may not transmit PEI signaling during any PEI occasion of the first subset of PEI occasions. UE 115-*b* may perform blind decoding on a second subset of PEI occasions, for example based on PEI signaling not being transmitted on the first subset of PEI occasions.

In another example, UE 115-*b* may perform blind decoding on a first PEI occasion corresponding to a first subset of PEI occasions. In some cases, UE 115-*b* may detect PEI signaling in the first PEI occasion of the first subset of PEI occasions. In some cases, UE 115-*b* may perform PEI detection on additional PEI occasions of the first subset of PEI occasions, such as for SNR boosting. In some examples, UE 115-*b* may ignore a remaining subset of PEI occasions (e.g., in other subsets of PEI occasions) based on detecting the PEI signaling during at least the first PEI occasion corresponding to the first subset of PEI occasions.

In some cases, UE 115-*b* may not detect the scheduling conflict until the collision or scheduling conflict occurs. For example, the collision may be unknown to UE 115-*b*, and UE 115-*b* may not identify PEI in one or more selected PEI occasions. In some cases, UE 115-*b* may refrain from processing any remaining PEI occasions if UE 115-*b* does not detect PEI in the first selected PEI occasions. In some examples, UE 115-*b* may monitor for PEI signaling during the set of PEI occasions until either a threshold number of PEI occasions have been monitored or until detection of the PEI signaling. For example, UE 115-*b* may monitor for PEI signaling during the colliding one or more symbol periods and continue to monitor for the PEI signaling until either UE 115-*b* detects the PEI or monitors a threshold number of PEI occasions. The threshold number of PEI occasions may be indicated in paging signaling (e.g., a PEI signal or paging PDCCH signaling) or may be configured (e.g., preconfigured) as part of the PEI configuration.

In some cases, base station 105-*b* may transmit an indication for UE 115-*b* to stop monitoring PEI occasions. For example, UE 115-*b* may receive, via PEI signaling in a PEI occasion or paging signaling in a paging occasion, an indication to stop monitoring for a remaining portion of the set of PEI occasions. UE 115-*b* may then refrain from monitoring for the remaining portion of the set of PEI occasions. In some cases, UE 115-*b* may be configured for repeated segments, or chunks, of PEI occasions, where each segment includes one or more PEI occasions. If UE 115-*b* does not detect PEI within one segment, UE 115-*b* may continue performing PEI detection until UE 115-*b* has just a single segment of PEI occasions remaining. For example, UE 115-*b* may monitor for PEI signaling during at least a portion of the set of PEI occasions based on being scheduled for multiple sets of PEI sets.

In some cases, UE 115-*b* may monitor for PEI signaling within a PEI monitoring window. For example, UE 115-*b* may receive signaling (e.g., the signaling at 505) indicating a configuration for a PEI window associated with a set of multiple PEI occasions, the PEI window separated from a paging occasion by a gap in time. Base station 105-*b* may transmit PEI to UE 115-*b* within the PEI window, which may reduce a processing or monitoring strain for UE 115-*b* to detect PEI signaling. UE 115-*b* may determine whether to monitor, while operating in an inactive or idle mode, for PEI signaling during one of the set of multiple PEI occasions within the PEI window based on the configuration.

Figure 7:
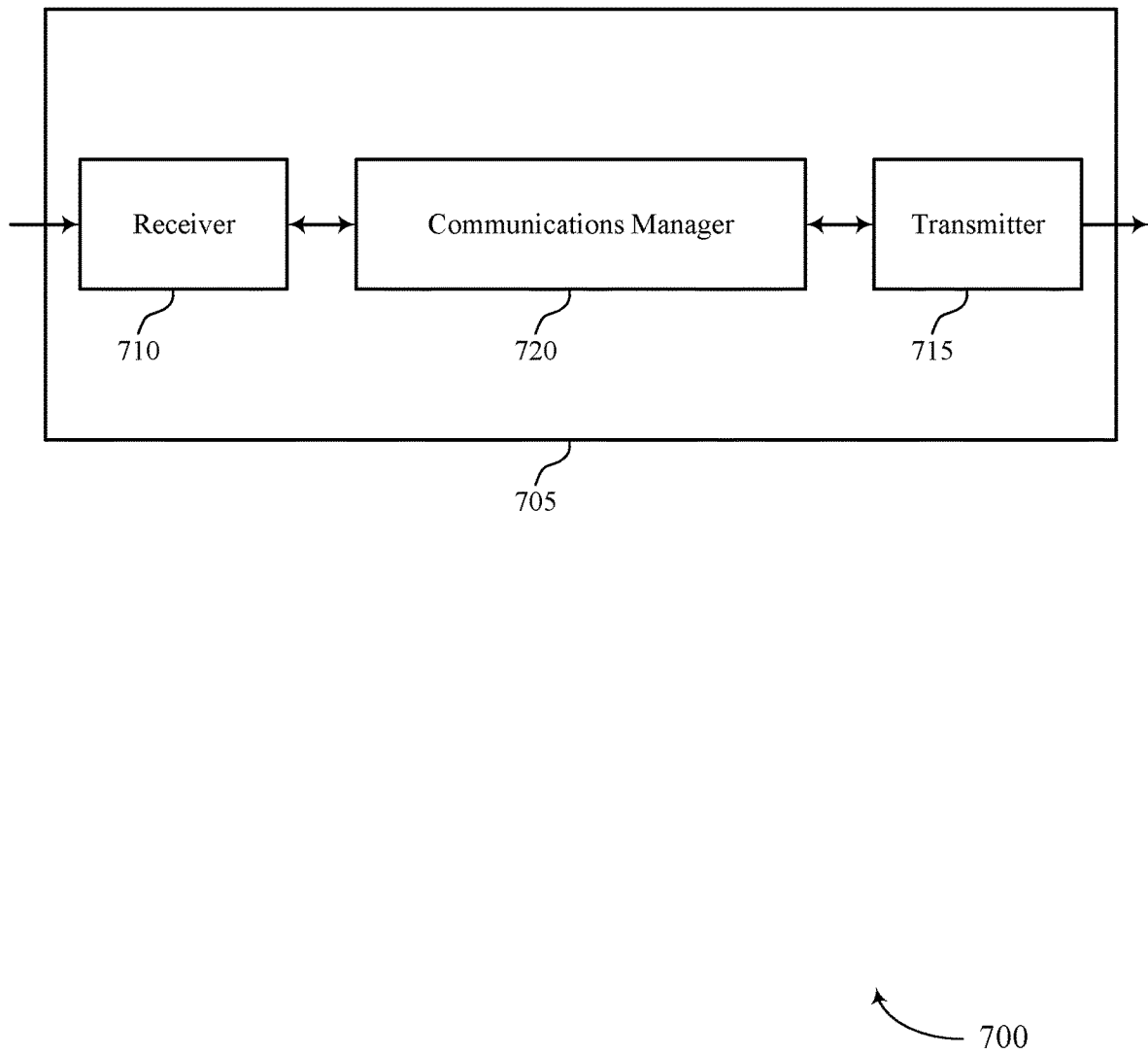
FIGS. 7 and 8 show block diagrams of devices that support techniques for PEI repetition in accordance with aspects of the present disclosure.

FIG. 7 shows a block diagram 700 of a device 705 that supports techniques for PEI repetition in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for PEI repetition). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for PEI repetition). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for PEI repetition as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving signaling indicating a PEI configuration associated with an idle or inactive mode for the UE. The communications manager 720 may be configured as or otherwise support a means for determining a scheduling conflict during one or more symbols based on a set of PEI occasions being scheduled for at least the one or more symbols based on the PEI configuration. The communications manager 720 may be configured as or otherwise support a means for monitoring for at least a portion of the set of PEI occasions based on determining the scheduling conflict.

Additionally or alternatively, the communications manager 720 may support wireless communications at a UE in accordance with examples as disclosed herein. For example, the communications manager 720 may be configured as or otherwise support a means for receiving signaling indicating a configuration for a PEI window associated with a set of multiple PEI occasions, the PEI window separated from a paging occasion by a gap in time. The communications manager 720 may be configured as or otherwise support a means for determining whether to monitor, while operating in an inactive or idle mode, for PEI signaling during one or more of the set of multiple PEI occasions within the PEI window based on the configuration.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing and power consumption at the UE 115. For example, by providing techniques to resolve a scheduling conflict with a PEI repetition, a UE 115 may reduce processing time to decode and obtain PEI signaling.

Figure 8:
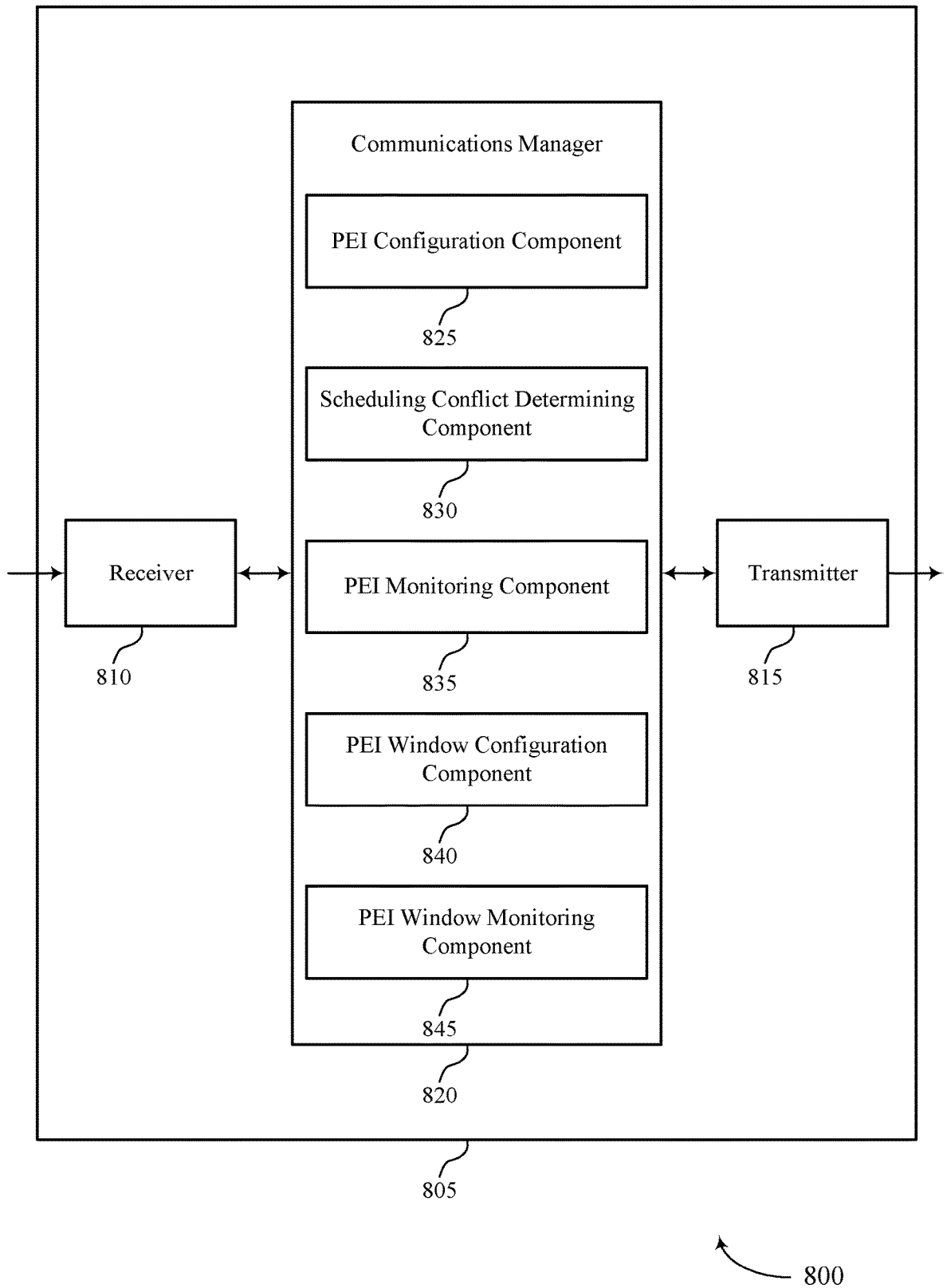

FIG. 8 shows a block diagram 800 of a device 805 that supports techniques for PEI repetition in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for PEI repetition). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for PEI repetition). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for PEI repetition as described herein. For example, the communications manager 820 may include a PEI configuration component 825, a scheduling conflict determining component 830, a PEI monitoring component 835, a PEI window configuration component 840, a PEI window monitoring component 845, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The PEI configuration component 825 may be configured as or otherwise support a means for receiving signaling indicating a PEI configuration associated with an idle or inactive mode for the UE. The scheduling conflict determining component 830 may be configured as or otherwise support a means for determining a scheduling conflict during one or more symbols based on a set of PEI occasions being scheduled for at least the one or more symbols based on the PEI configuration. The PEI monitoring component 835 may be configured as or otherwise support a means for monitoring for at least a portion of the set of PEI occasions based on determining the scheduling conflict.

Additionally or alternatively, the communications manager 820 may support wireless communications at a UE in accordance with examples as disclosed herein. The PEI window configuration component 840 may be configured as or otherwise support a means for receiving signaling indicating a configuration for a PEI window associated with a set of multiple PEI occasions, the PEI window separated from a paging occasion by a gap in time. The PEI window monitoring component 845 may be configured as or otherwise support a means for determining whether to monitor, while operating in an inactive or idle mode, for PEI signaling during one or more of the set of multiple PEI occasions within the PEI window based on the configuration.

Figure 9:
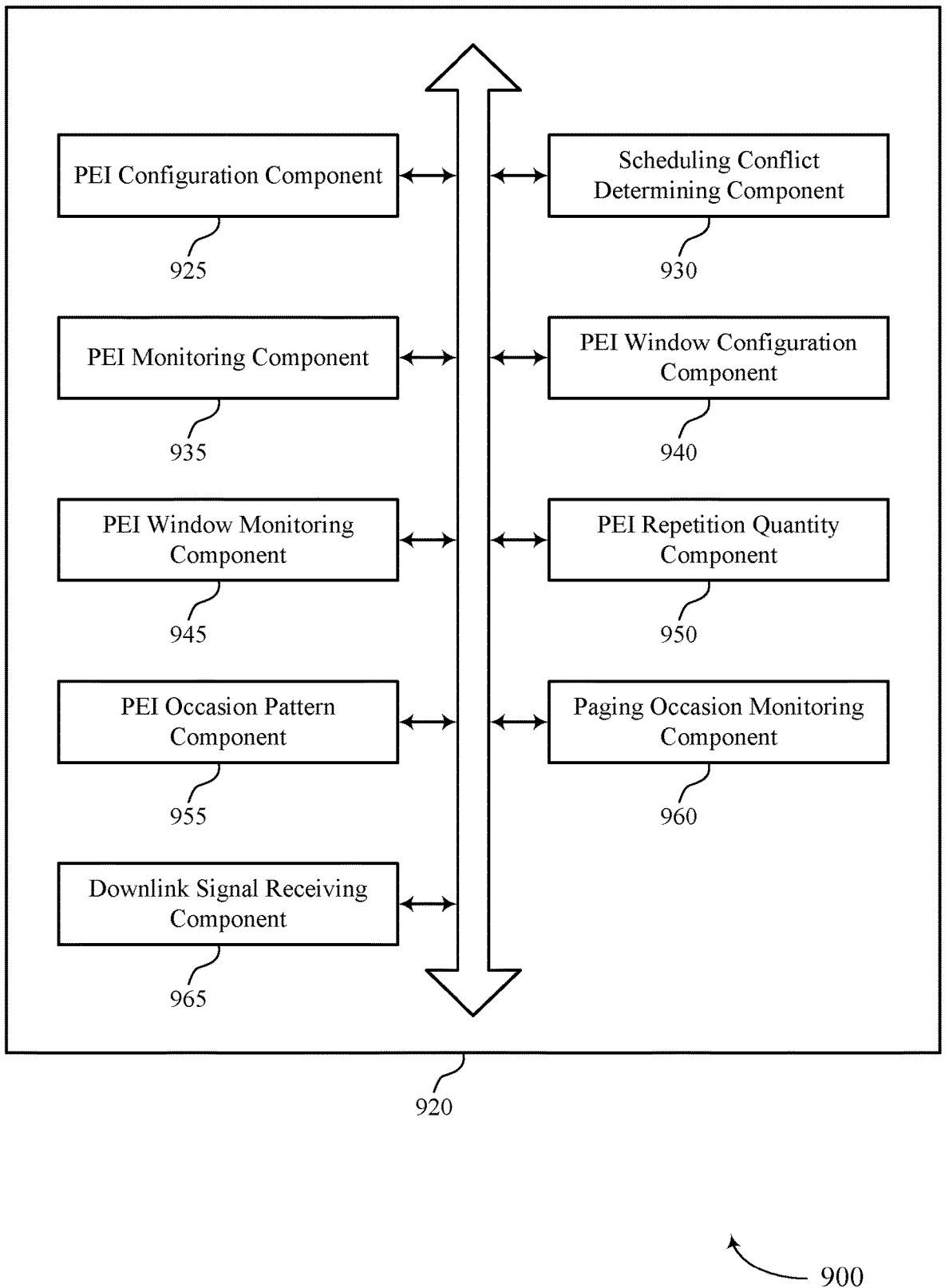
FIG. 9 shows a block diagram of a communications manager that supports techniques for PEI repetition in accordance with aspects of the present disclosure.

FIG. 9 shows a block diagram 900 of a communications manager 920 that supports techniques for PEI repetition in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for PEI repetition as described herein. For example, the communications manager 920 may include a PEI configuration component 925, a scheduling conflict determining component 930, a PEI monitoring component 935, a PEI window configuration component 940, a PEI window monitoring component 945, a PEI repetition quantity component 950, a PEI occasion pattern component 955, a paging occasion monitoring component 960, a downlink signal receiving component 965, or any combination thereof. Each of these components may communicate, directly or indirectly, with one another (e.g., via one or more buses).

The communications manager 920 may support wireless communications at a UE in accordance with examples as disclosed herein. The PEI configuration component 925 may be configured as or otherwise support a means for receiving signaling indicating a PEI configuration associated with an idle or inactive mode for the UE. The scheduling conflict determining component 930 may be configured as or otherwise support a means for determining a scheduling conflict during one or more symbols based on a set of PEI occasions being scheduled for at least the one or more symbols based on the PEI configuration. The PEI monitoring component 935 may be configured as or otherwise support a means for monitoring for at least a portion of the set of PEI occasions based on determining the scheduling conflict.

In some examples, to support monitoring, the scheduling conflict determining component 930 may be configured as or otherwise support a means for monitoring for PEI signaling during the one or more symbols or monitoring for downlink signaling during the one or more symbols based on the PEI configuration, where the scheduling conflict is based on the downlink signaling being scheduled during the one or more symbols.

In some examples, to support determining, the scheduling conflict determining component 930 may be configured as or otherwise support a means for determining the scheduling conflict based on a scheduling of downlink signaling during the one or more symbols.

In some examples, to support determining, the scheduling conflict determining component 930 may be configured as or otherwise support a means for determining the scheduling conflict based on a slot format of a slot including the one or more symbols, the slot format configuring the one or more symbols as uplink symbols.

In some examples, to support determining, the scheduling conflict determining component 930 may be configured as or otherwise support a means for performing blind decoding during one or more paging early indications of the set of paging early indication occasions without detecting paging early indication signaling.

In some examples, the PEI monitoring component 935 may be configured as or otherwise support a means for receiving the PEI signaling during the one or more symbols based on the PEI configuration assigning a higher priority to the PEI signaling than the downlink signaling.

In some examples, to support monitoring, the downlink signal receiving component 965 may be configured as or otherwise support a means for receiving the downlink signaling during the one or more symbols based on the PEI configuration assigning a higher priority to the downlink signaling than the PEI signaling.

In some examples, the downlink signaling includes PDCCH signaling scheduling a paging message, PDCCH signaling scheduling system information, an SSB, PDSCH carrying system information, a TRS, or any combination thereof.

In some examples, to support monitoring, the PEI monitoring component 935 may be configured as or otherwise support a means for monitoring for PEI signaling during a shifted set of PEI occasions based on determining the scheduling conflict, where the shifted set of PEI occasions start at a first symbol period after the scheduling conflict.

In some examples, to support monitoring, the PEI monitoring component 935 may be configured as or otherwise support a means for monitoring for PEI signaling during the portion of the set of PEI occasions excluding the one or more symbols based on determining the scheduling conflict.

In some examples, to support receiving the signaling indicating the PEI configuration, the PEI repetition quantity component 950 may be configured as or otherwise support a means for receiving an indication of a maximum number of PEI repetitions occasions associated with a paging occasion.

In some examples, the PEI repetition quantity component 950 may be configured as or otherwise support a means for receiving an indication of a number of transmitted PEI occasion repetitions in the set of PEI occasions. In some examples, the indication is received via an SIB, a previous PEI signal, PDCCH signaling scheduling a paging message, or any combination thereof. In some examples, the indication includes an indication of a pattern for the set of PEI occasions.

In some examples, the PEI repetition quantity component 950 may be configured as or otherwise support a means for performing blind decoding on the set of PEI occasions, where a number of PEI occasion repetitions associated with the set of PEI occasions is based on a blind decoding capability of the UE.

In some examples, the PEI occasion pattern component 955 may be configured as or otherwise support a means for performing blind decoding on a first PEI occasion corresponding to a first subset of the set of PEI occasions. In some examples, the PEI occasion pattern component 955 may be configured as or otherwise support a means for ignoring remaining PEI occasions corresponding to the first subset of the set of PEI occasions based on the blind decoding on the first PEI occasion being unsuccessful. In some examples, the PEI occasion pattern component 955 may be configured as or otherwise support a means for performing blind decoding on a second subset of the set of PEI occasions.

In some examples, the PEI occasion pattern component 955 may be configured as or otherwise support a means for performing blind decoding on a first PEI occasion corresponding to a subset of the set of PEI occasions. In some examples, the PEI occasion pattern component 955 may be configured as or otherwise support a means for ignoring a remaining subset of PEI occasions based on the blind decoding on the first PEI occasion being successful.

In some examples, the scheduling conflict determining component 930 may be configured as or otherwise support a means for receiving an indication of the scheduling conflict during the one or more symbols. In some examples, the PEI monitoring component 935 may be configured as or otherwise support a means for monitoring for PEI signaling during the portion of the set of PEI occasions based on receiving the indication of the scheduling conflict.

In some examples, to support monitoring, the PEI monitoring component 935 may be configured as or otherwise support a means for monitoring for PEI signaling during the one or more symbols until detection of the PEI signaling or until a threshold number of PEI occasions have been monitored. In some examples, to support monitoring, the PEI monitoring component 935 may be configured as or otherwise support a means for monitoring for PEI signaling during at least the portion of the set of PEI occasions based on being scheduled for a set of multiple sets of PEI sets.

In some examples, the PEI monitoring component 935 may be configured as or otherwise support a means for receiving, via PEI signaling in a PEI occasion or paging signaling in a paging occasion, an indication to stop monitoring for a remaining portion of the set of PEI occasions. In some examples, the PEI monitoring component 935 may be configured as or otherwise support a means for refraining from monitoring for the remaining portion of the set of PEI occasions.

In some examples, the scheduling conflict determining component 930 may be configured as or otherwise support a means for refraining from monitoring for PEI signaling during the one or more symbols based on the set of PEI occasions having the scheduling conflict with one or more uplink symbols.

Additionally or alternatively, the communications manager 920 may support wireless communications at a UE in accordance with examples as disclosed herein. The PEI window configuration component 940 may be configured as or otherwise support a means for receiving signaling indicating a configuration for a PEI window associated with a set of multiple PEI occasions, the PEI window separated from a paging occasion by a gap in time. The PEI window monitoring component 945 may be configured as or otherwise support a means for determining whether to monitor, while operating in an inactive or idle mode, for PEI signaling during one or more of the set of multiple PEI occasions within the PEI window based on the configuration.

In some examples, the PEI window monitoring component 945 may be configured as or otherwise support a means for monitoring for PEI signaling during the one or more of the set of multiple PEI occasions within the PEI window based on the configuration. In some examples, the paging occasion monitoring component 960 may be configured as or otherwise support a means for monitoring for PDCCH signaling during the paging occasion based on detecting the PEI signaling during the one or more of the set of multiple PEI occasions.

In some examples, to support monitoring, the PEI window monitoring component 945 may be configured as or otherwise support a means for monitoring for PEI signaling during a subset of the set of multiple PEI occasions based on determining a scheduling conflict for a remaining subset of PEI occasions.

In some examples, the PEI window configuration component 940 may be configured as or otherwise support a means for determining none of the set of multiple PEI occasions are configured within the PEI window. In some examples, the paging occasion monitoring component 960 may be configured as or otherwise support a means for monitoring for PDCCH signaling scheduling paging messages during the paging occasion based on none of the set of multiple PEI occasions being configured within the PEI window.

In some examples, the PEI window configuration component 940 may be configured as or otherwise support a means for determining none of the set of multiple PEI occasions are configured within the PEI window. In some examples, the PEI window configuration component 940 may be configured as or otherwise support a means for refraining from monitoring for PDCCH signaling scheduling paging messages during the paging occasion based on none of the set of multiple PEI occasions being configured within the PEI window.

Figure 10:
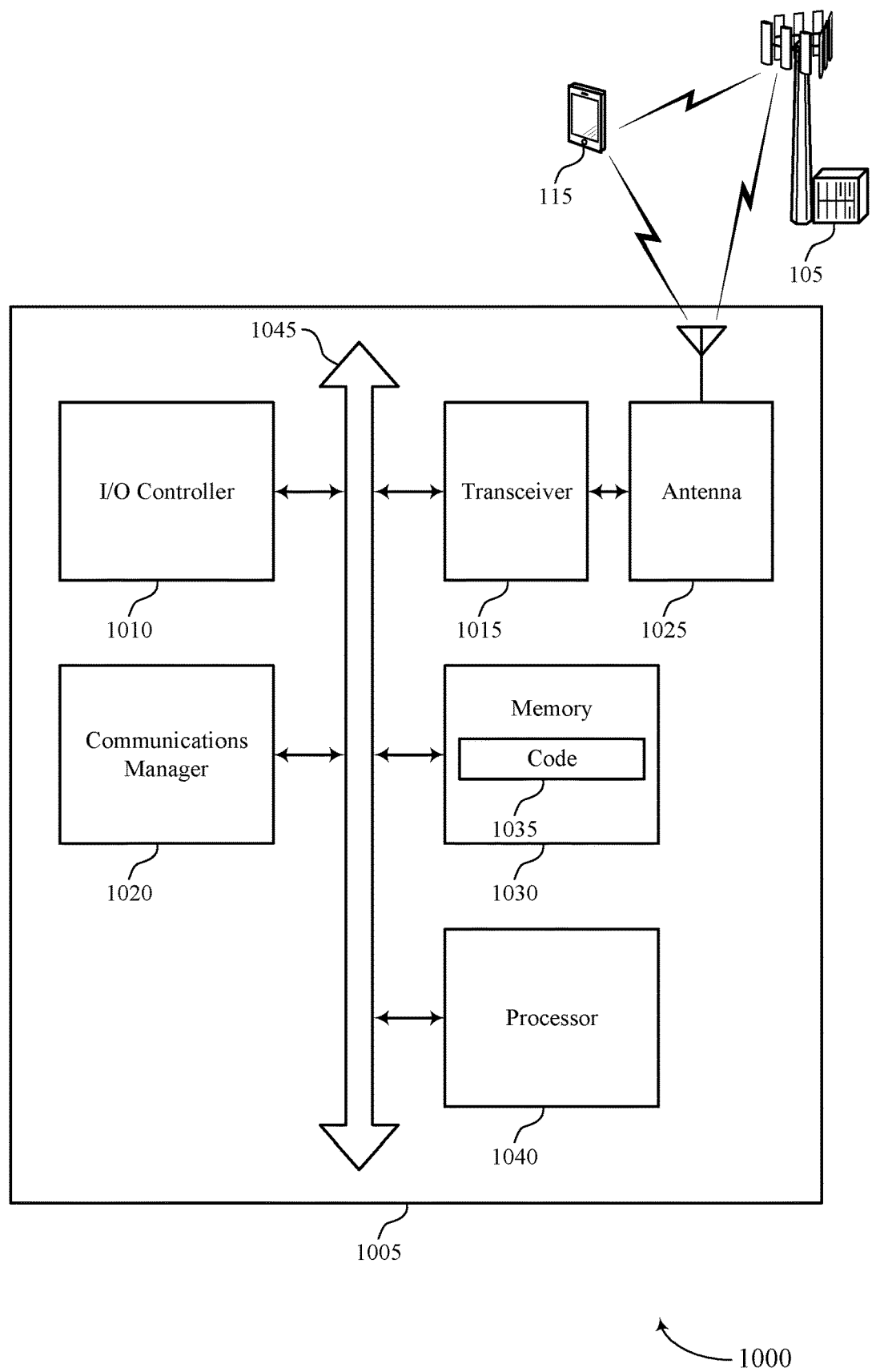
FIG. 10 shows a diagram of a system including a device that supports techniques for PEI repetition in accordance with aspects of the present disclosure.

FIG. 10 shows a diagram of a system 1000 including a device 1005 that supports techniques for PEI repetition in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for PEI repetition). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving signaling indicating a PEI configuration associated with an idle or inactive mode for the UE. The communications manager 1020 may be configured as or otherwise support a means for determining a scheduling conflict during one or more symbols based on a set of PEI occasions being scheduled for at least the one or more symbols based on the PEI configuration. The communications manager 1020 may be configured as or otherwise support a means for monitoring for at least a portion of the set of PEI occasions based on determining the scheduling conflict.

Additionally or alternatively, the communications manager 1020 may support wireless communications at a UE in accordance with examples as disclosed herein. For example, the communications manager 1020 may be configured as or otherwise support a means for receiving signaling indicating a configuration for a PEI window associated with a set of multiple PEI occasions, the PEI window separated from a paging occasion by a gap in time. The communications manager 1020 may be configured as or otherwise support a means for determining whether to monitor, while operating in an inactive or idle mode, for PEI signaling during one or more of the set of multiple PEI occasions within the PEI window based on the configuration.

By including or configuring the communications manager 1020 in accordance with examples as described herein, the device 1005 may support techniques for reduced latency for data signaling. For example, by providing techniques to resolve scheduling conflicts of collisions with PEI, a UE 115 may more reliably obtain and decode PEI signaling, which may prevent the UE 115 from missing paging signaling during a paging occasion or prevent the UE 115 from spending additional power resources to wake up for the paging occasion. Additionally, resolving scheduling conflicts for PEI repetitions may enable the UE 115 to receive both PEI signaling and conflicting downlink signaling, such as by shifting the PEI occasions to after the downlink signaling, resulting in higher throughput.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for PEI repetition as described herein, or the processor 1040 and the memory 1030 may be otherwise configured to perform or support such operations.

Figure 11:
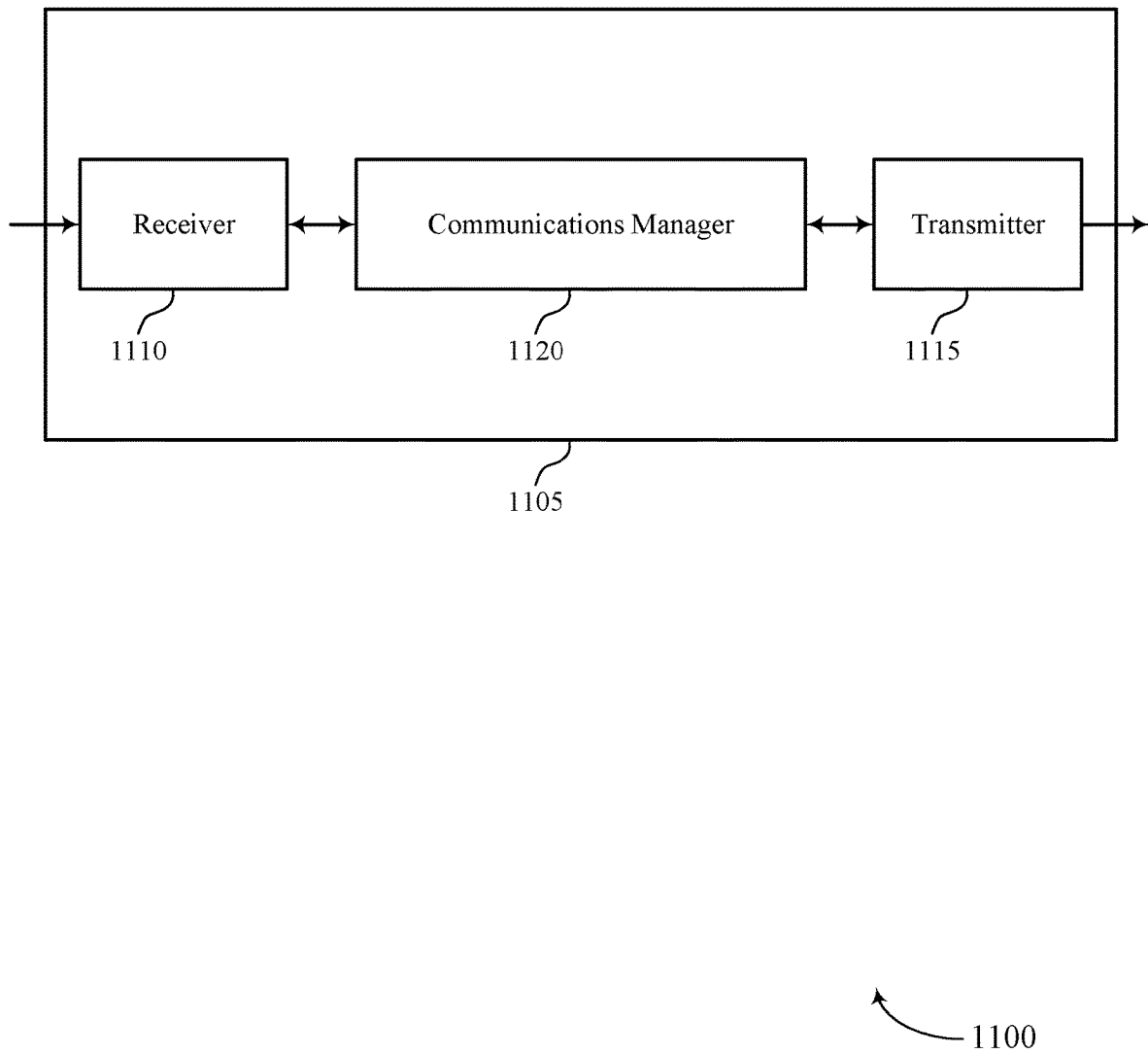
FIGS. 11 and 12 show block diagrams of devices that support techniques for PEI repetition in accordance with aspects of the present disclosure.

FIG. 11 shows a block diagram 1100 of a device 1105 that supports techniques for PEI repetition in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for PEI repetition). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for PEI repetition). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for PEI repetition as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting signaling indicating a PEI configuration associated with an idle or inactive mode for a UE. The communications manager 1120 may be configured as or otherwise support a means for determining a scheduling conflict during one or more symbols based on a set of PEI occasions being scheduled for at least the one or more symbols based on the PEI configuration. The communications manager 1120 may be configured as or otherwise support a means for transmitting PEI signaling during at least a portion of the set of PEI occasions based on determining the scheduling conflict.

Additionally or alternatively, the communications manager 1120 may support wireless communications at a base station in accordance with examples as disclosed herein. For example, the communications manager 1120 may be configured as or otherwise support a means for transmitting signaling indicating a configuration for a PEI window including a set of multiple PEI occasions, the PEI window separated from a paging occasion by a gap in time. The communications manager 1120 may be configured as or otherwise support a means for transmitting, to a UE operating in an inactive or idle mode, PEI signaling during one or more of the set of multiple PEI occasions within the PEI window based on the configuration.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources by resolving, or avoiding, scheduling conflicts or collisions between PEI repetitions and other signaling.

Figure 12:
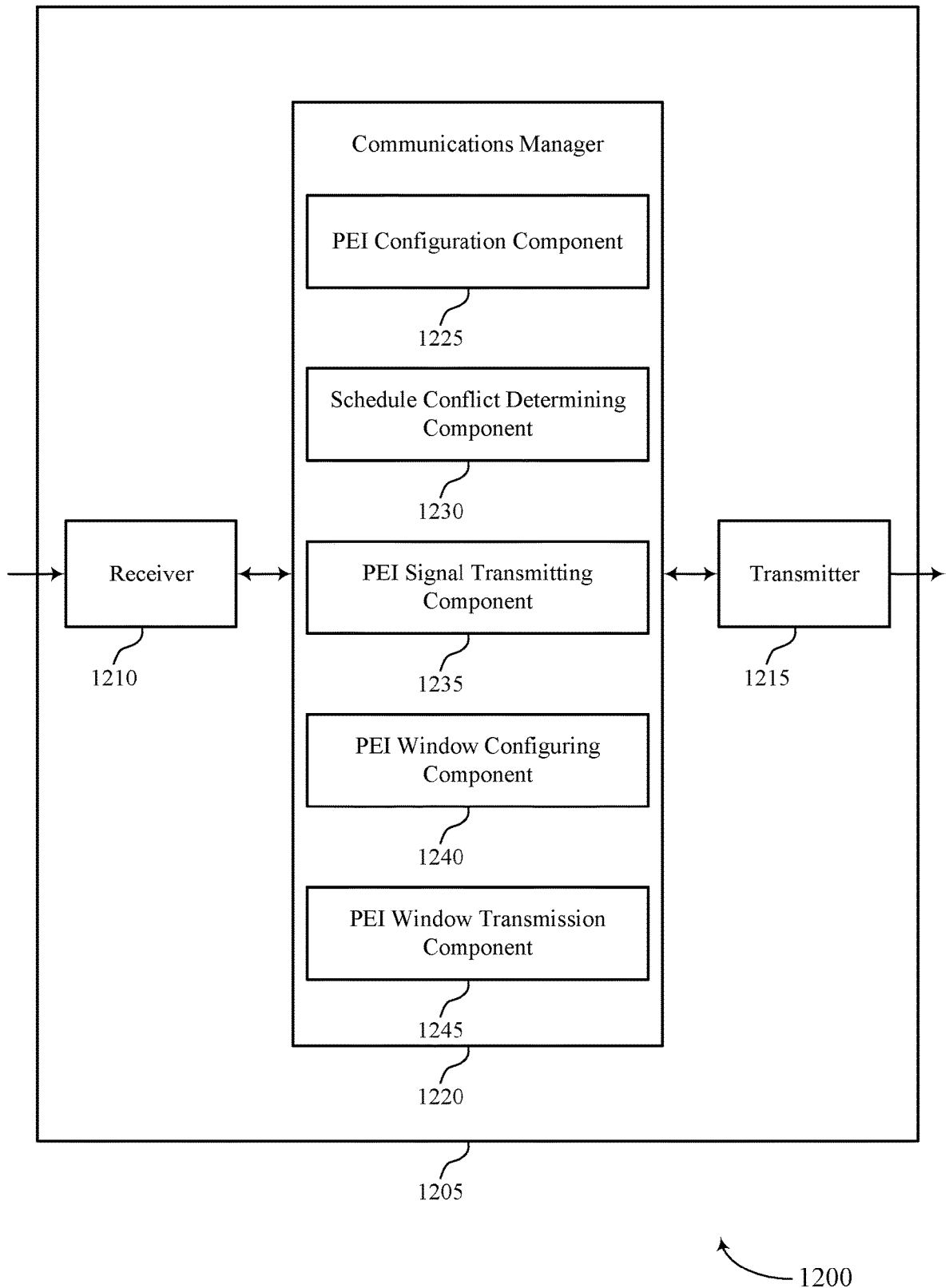

FIG. 12 shows a block diagram 1200 of a device 1205 that supports techniques for PEI repetition in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for PEI repetition). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for PEI repetition). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for PEI repetition as described herein. For example, the communications manager 1220 may include a PEI configuration component 1225, a schedule conflict determining component 1230, a PEI signal transmitting component 1235, a PEI window configuring component 1240, a PEI window transmission component 1245, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The PEI configuration component 1225 may be configured as or otherwise support a means for transmitting signaling indicating a PEI configuration associated with an idle or inactive mode for a UE. The schedule conflict determining component 1230 may be configured as or otherwise support a means for determining a scheduling conflict during one or more symbols based on a set of PEI occasions being scheduled for at least the one or more symbols based on the PEI configuration. The PEI signal transmitting component 1235 may be configured as or otherwise support a means for transmitting PEI signaling during at least a portion of the set of PEI occasions based on determining the scheduling conflict.

Additionally or alternatively, the communications manager 1220 may support wireless communications at a base station in accordance with examples as disclosed herein. The PEI window configuring component 1240 may be configured as or otherwise support a means for transmitting signaling indicating a configuration for a PEI window including a set of multiple PEI occasions, the PEI window separated from a paging occasion by a gap in time. The PEI window transmission component 1245 may be configured as or otherwise support a means for transmitting, to a UE operating in an inactive or idle mode, PEI signaling during one or more of the set of multiple PEI occasions within the PEI window based on the configuration.

Figure 13:
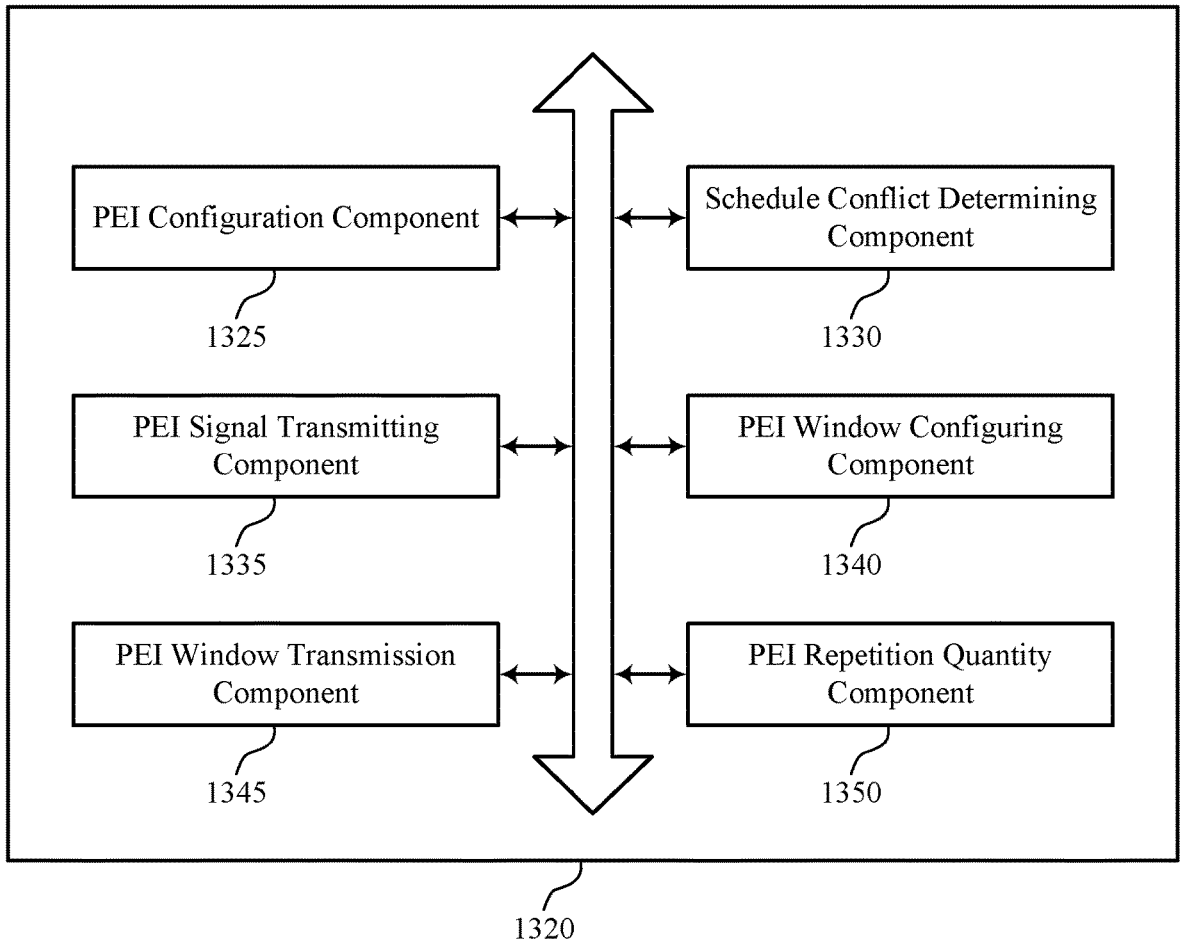
FIG. 13 shows a block diagram of a communications manager that supports techniques for PEI repetition in accordance with aspects of the present disclosure.

FIG. 13 shows a block diagram 1300 of a communications manager 1320 that supports techniques for PEI repetition in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for PEI repetition as described herein. For example, the communications manager 1320 may include a PEI configuration component 1325, a schedule conflict determining component 1330, a PEI signal transmitting component 1335, a PEI window configuring component 1340, a PEI window transmission component 1345, a PEI repetition quantity component 1350, or any combination thereof. Each of these components may communicate, directly or indirectly, with one another (e.g., via one or more buses).

The communications manager 1320 may support wireless communications at a base station in accordance with examples as disclosed herein. The PEI configuration component 1325 may be configured as or otherwise support a means for transmitting signaling indicating a PEI configuration associated with an idle or inactive mode for a UE. The schedule conflict determining component 1330 may be configured as or otherwise support a means for determining a scheduling conflict during one or more symbols based on a set of PEI occasions being scheduled for at least the one or more symbols based on the PEI configuration. The PEI signal transmitting component 1335 may be configured as or otherwise support a means for transmitting PEI signaling during at least a portion of the set of PEI occasions based on determining the scheduling conflict.

In some examples, to support transmitting, the schedule conflict determining component 1330 may be configured as or otherwise support a means for transmitting the PEI signaling during the one or more symbols or transmitting downlink signaling during the one or more symbols based on the PEI configuration, where the scheduling conflict is based on the downlink signaling and the set of PEI occasions being scheduled during the one or more symbols.

In some examples, to support transmitting, the PEI signal transmitting component 1335 may be configured as or otherwise support a means for transmitting the PEI signaling during a shifted set of PEI occasions based on the scheduling conflict, where the shifted set of PEI occasions start at a first symbol period after the scheduling conflict.

In some examples, to support transmitting, the PEI signal transmitting component 1335 may be configured as or otherwise support a means for transmitting the PEI signaling during the portion of the set of PEI occasions excluding the one or more symbols based on the scheduling conflict.

In some examples, to support transmitting the signaling indicating the PEI configuration, the PEI repetition quantity component 1350 may be configured as or otherwise support a means for transmitting an indication of a maximum number of PEI repetitions occasions associated with a paging occasion. In some examples, the PEI repetition quantity component 1350 may be configured as or otherwise support a means for transmitting an indication of a number of PEI occasion repetitions in the set of PEI occasions.

In some examples, the PEI signal transmitting component 1335 may be configured as or otherwise support a means for transmitting the PEI signaling on a subset of PEI occasions of the set of PEI occasions. In some examples, the schedule conflict determining component 1330 may be configured as or otherwise support a means for refraining from transmitting the PEI signaling on a remaining subset of PEI occasions of the set of PEI occasions.

Additionally or alternatively, the communications manager 1320 may support wireless communications at a base station in accordance with examples as disclosed herein. The PEI window configuring component 1340 may be configured as or otherwise support a means for transmitting signaling indicating a configuration for a PEI window including a set of multiple PEI occasions, the PEI window separated from a paging occasion by a gap in time. The PEI window transmission component 1345 may be configured as or otherwise support a means for transmitting, to a UE operating in an inactive or idle mode, PEI signaling during one or more of the set of multiple PEI occasions within the PEI window based on the configuration.

Figure 14:
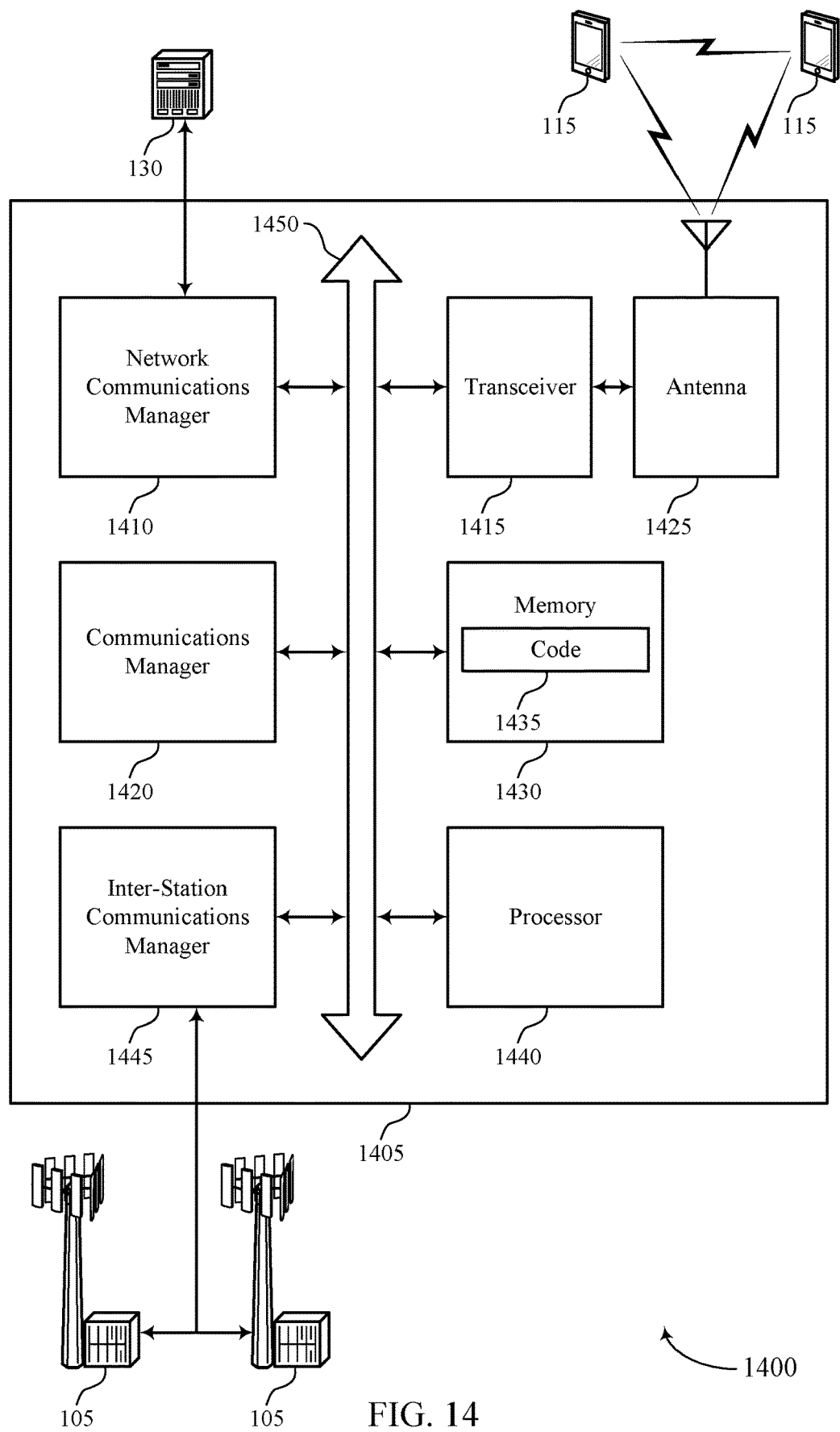
FIG. 14 shows a diagram of a system including a device that supports techniques for PEI repetition in accordance with aspects of the present disclosure.

FIG. 14 shows a diagram of a system 1400 including a device 1405 that supports techniques for PEI repetition in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for PEI repetition). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting signaling indicating a PEI configuration associated with an idle or inactive mode for a UE. The communications manager 1420 may be configured as or otherwise support a means for determining a scheduling conflict during one or more symbols based on a set of PEI occasions being scheduled for at least the one or more symbols based on the PEI configuration. The communications manager 1420 may be configured as or otherwise support a means for transmitting PEI signaling during at least a portion of the set of PEI occasions based on determining the scheduling conflict.

Additionally or alternatively, the communications manager 1420 may support wireless communications at a base station in accordance with examples as disclosed herein. For example, the communications manager 1420 may be configured as or otherwise support a means for transmitting signaling indicating a configuration for a PEI window including a set of multiple PEI occasions, the PEI window separated from a paging occasion by a gap in time. The communications manager 1420 may be configured as or otherwise support a means for transmitting, to a UE operating in an inactive or idle mode, PEI signaling during one or more of the set of multiple PEI occasions within the PEI window based on the configuration.

By including or configuring the communications manager 1420 in accordance with examples as described herein, the device 1405 may support techniques for more efficient utilization of communication resources and improved coordination between devices. For example, by resolving or preventing collisions or scheduling conflicts between PEI signaling and scheduled channels or signaling, a base station 105 may transmit both the PEI signaling and the other channels or signaling.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device

1405 to perform various aspects of techniques for PEI repetition as described herein, or the processor 1440 and the memory 1430 may be otherwise configured to perform or support such operations.

Figure 15:
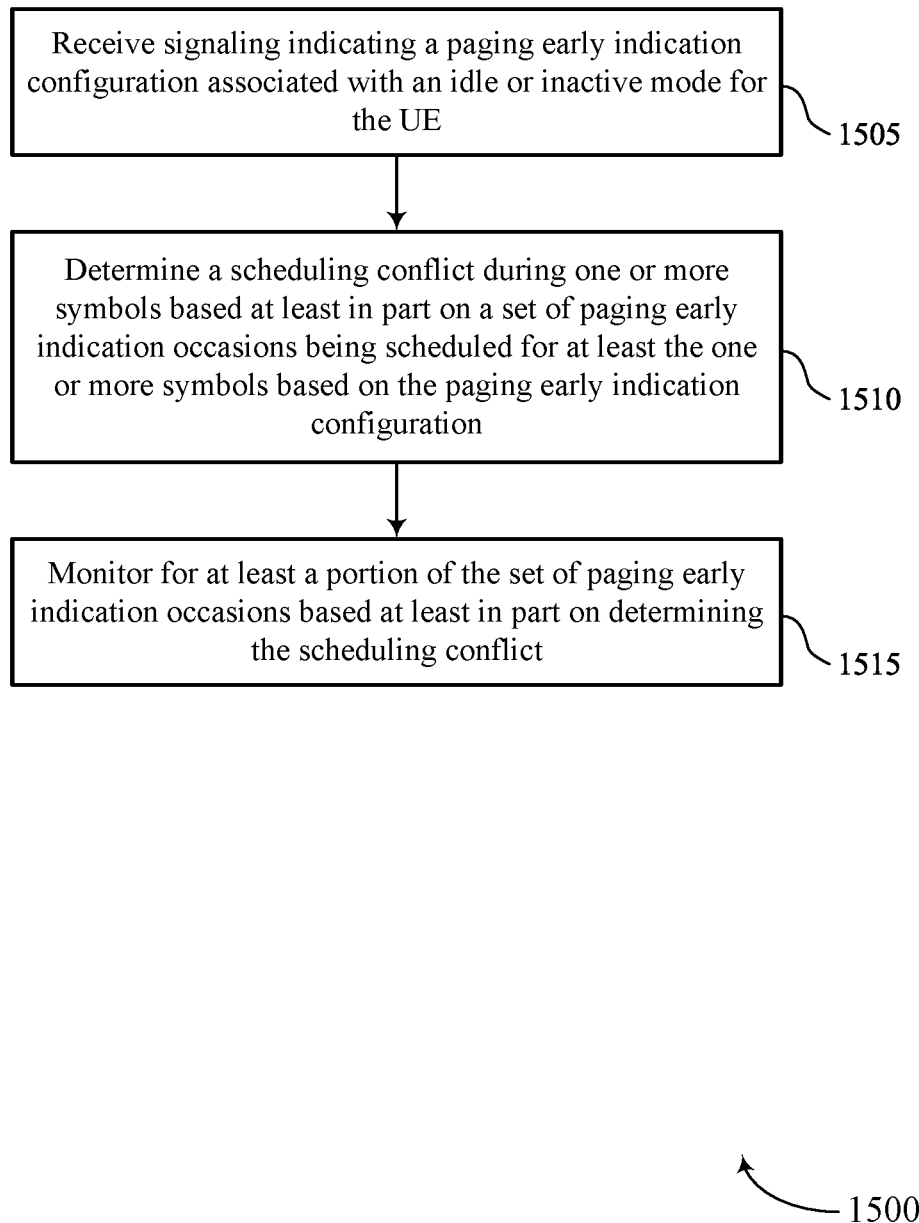
FIGS. 15 through 20 show flowcharts illustrating methods that support techniques for PEI repetition in accordance with aspects of the present disclosure.

FIG. 15 shows a flowchart illustrating a method 1500 that supports techniques for PEI repetition in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving signaling indicating a PEI configuration associated with an idle or inactive mode for the UE. The operations of 1505 may be performed in accordance with examples as disclosed herein. In some examples, aspects of the operations of 1505 may be performed by a PEI configuration component 925 as described with reference to FIG. 9.

At 1510, the method may include determining a scheduling conflict during one or more symbols based on a set of PEI occasions being scheduled for at least the one or more symbols based on the PEI configuration. The operations of 1510 may be performed in accordance with examples as disclosed herein. In some examples, aspects of the operations of 1510 may be performed by a scheduling conflict determining component 930 as described with reference to FIG. 9.

At 1515, the method may include monitoring for at least a portion of the set of PEI occasions based on determining the scheduling conflict. The operations of 1515 may be performed in accordance with examples as disclosed herein. In some examples, aspects of the operations of 1515 may be performed by a PEI monitoring component 935 as described with reference to FIG. 9.

Figure 16:
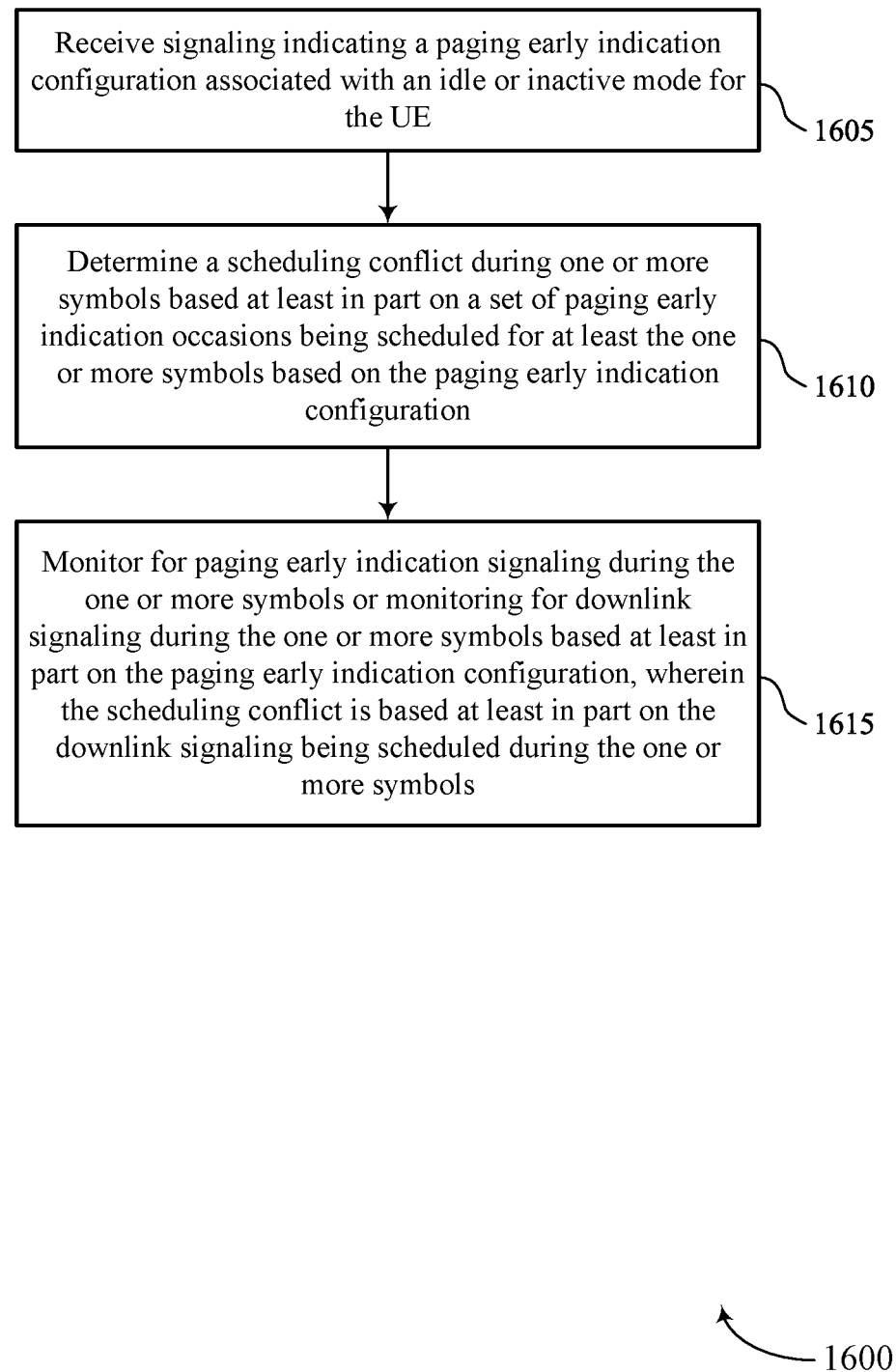

FIG. 16 shows a flowchart illustrating a method 1600 that supports techniques for PEI repetition in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving signaling indicating a PEI configuration associated with an idle or inactive mode for the UE. The operations of 1605 may be performed in accordance with examples as disclosed herein. In some examples, aspects of the operations of 1605 may be performed by a PEI configuration component 925 as described with reference to FIG. 9.

At 1610, the method may include determining a scheduling conflict during one or more symbols based on a set of PEI occasions being scheduled for at least the one or more symbols based on the PEI configuration. The operations of 1610 may be performed in accordance with examples as disclosed herein. In some examples, aspects of the operations of 1610 may be performed by a scheduling conflict determining component 930 as described with reference to FIG. 9.

At 1615, the method may include monitoring for PEI signaling during the one or more symbols or monitoring for downlink signaling during the one or more symbols based on the PEI configuration, where the scheduling conflict is based on the downlink signaling being scheduled during the one or more symbols. The operations of 1615 may be performed in accordance with examples as disclosed herein. In some examples, aspects of the operations of 1615 may be performed by a scheduling conflict determining component 930 as described with reference to FIG. 9.

Figure 17:
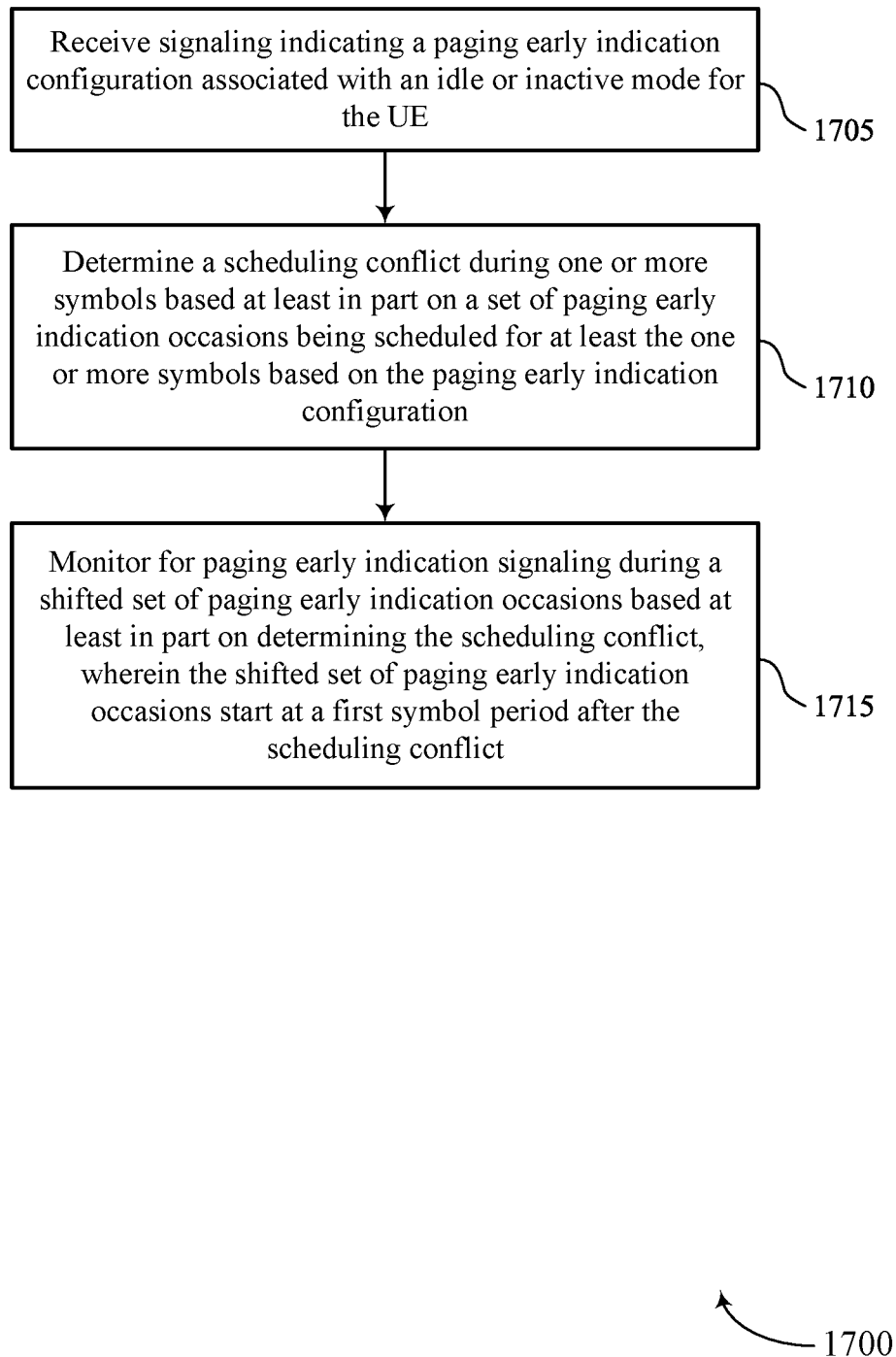

FIG. 17 shows a flowchart illustrating a method 1700 that supports techniques for PEI repetition in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving signaling indicating a PEI configuration associated with an idle or inactive mode for the UE. The operations of 1705 may be performed in accordance with examples as disclosed herein. In some examples, aspects of the operations of 1705 may be performed by a PEI configuration component 925 as described with reference to FIG. 9.

At 1710, the method may include determining a scheduling conflict during one or more symbols based on a set of PEI occasions being scheduled for at least the one or more symbols based on the PEI configuration. The operations of 1710 may be performed in accordance with examples as disclosed herein. In some examples, aspects of the operations of 1710 may be performed by a scheduling conflict determining component 930 as described with reference to FIG. 9.

At 1715, the method may include monitoring for PEI signaling during a shifted set of PEI occasions based on determining the scheduling conflict, where the shifted set of PEI occasions start at a first symbol period after the scheduling conflict. The operations of 1715 may be performed in accordance with examples as disclosed herein. In some examples, aspects of the operations of 1715 may be performed by a PEI monitoring component 935 as described with reference to FIG. 9.

Figure 18:
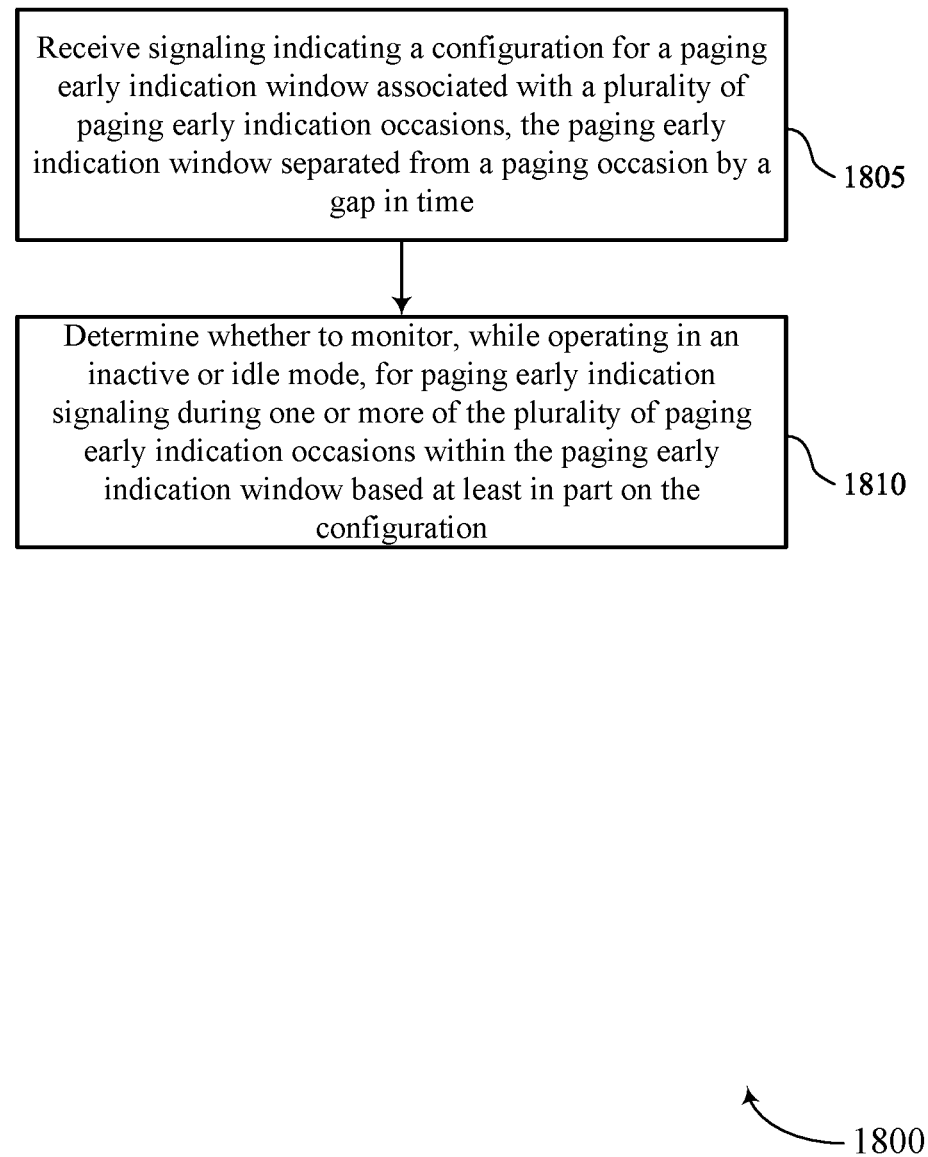

FIG. 18 shows a flowchart illustrating a method 1800 that supports techniques for PEI repetition in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving signaling indicating a configuration for a PEI window associated with a set of multiple PEI occasions, the PEI window separated from a paging occasion by a gap in time. The operations of 1805 may be performed in accordance with examples as disclosed herein. In some examples, aspects of the operations of 1805 may be performed by a PEI window configuration component 940 as described with reference to FIG. 9.

At 1810, the method may include determining whether to monitor, while operating in an inactive or idle mode, for PEI signaling during one or more of the set of multiple PEI occasions within the PEI window based on the configuration. The operations of 1810 may be performed in accordance with examples as disclosed herein. In some examples, aspects of the operations of 1810 may be performed by a PEI window monitoring component 945 as described with reference to FIG. 9.

Figure 19:
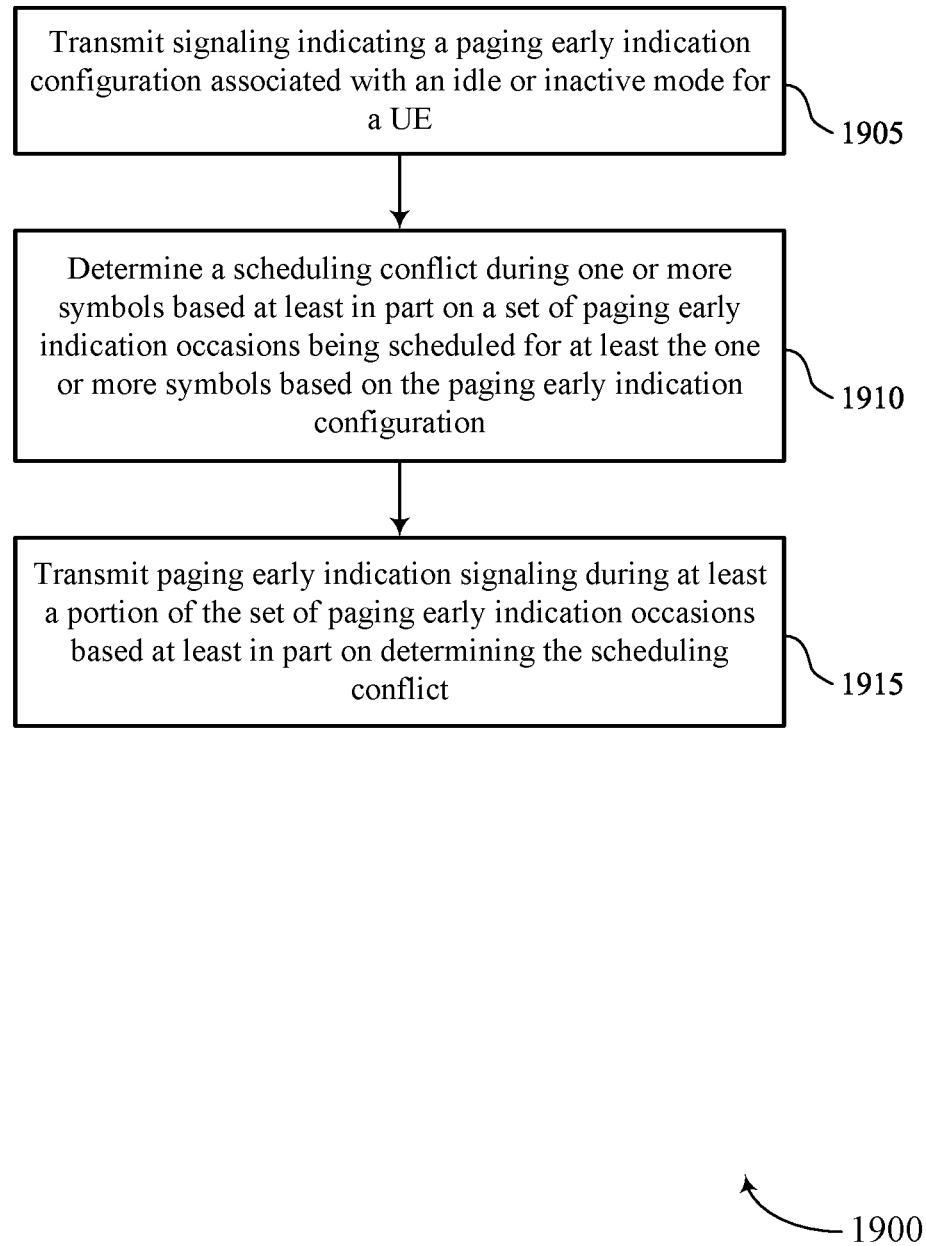

FIG. 19 shows a flowchart illustrating a method 1900 that supports techniques for PEI repetition in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting signaling indicating a PEI configuration associated with an idle or inactive mode for a UE. The operations of 1905 may be performed in accordance with examples as disclosed herein. In some examples, aspects of the operations of 1905 may be performed by a PEI configuration component 1325 as described with reference to FIG. 13.

At 1910, the method may include determining a scheduling conflict during one or more symbols based on a set of PEI occasions being scheduled for at least the one or more symbols based on the PEI configuration. The operations of 1910 may be performed in accordance with examples as disclosed herein. In some examples, aspects of the operations of 1910 may be performed by a schedule conflict determining component 1330 as described with reference to FIG. 13.

At 1915, the method may include transmitting PEI signaling during at least a portion of the set of PEI occasions based on determining the scheduling conflict. The operations of 1915 may be performed in accordance with examples as disclosed herein. In some examples, aspects of the operations of 1915 may be performed by a PEI signal transmitting component 1335 as described with reference to FIG. 13.

Figure 20:
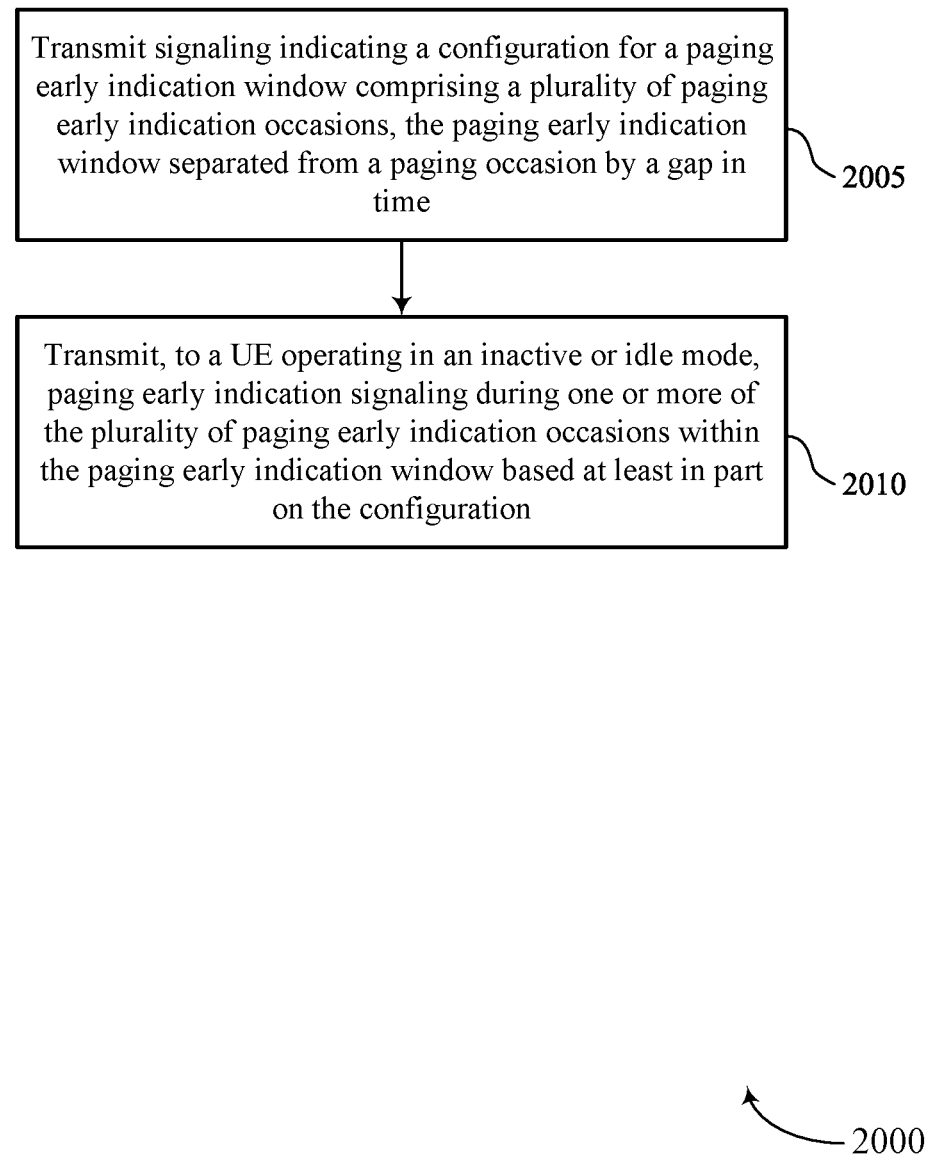

FIG. 20 shows a flowchart illustrating a method 2000 that supports techniques for PEI repetition in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting signaling indicating a configuration for a PEI window including a set of multiple PEI occasions, the PEI window separated from a paging occasion by a gap in time. The operations of 2005 may be performed in accordance with examples as disclosed herein. In some examples, aspects of the operations of 2005 may be performed by a PEI window configuring component 1340 as described with reference to FIG. 13.

At 2010, the method may include transmitting, to a UE operating in an inactive or idle mode, PEI signaling during one or more of the set of multiple PEI occasions within the PEI window based on the configuration. The operations of 2010 may be performed in accordance with examples as disclosed herein. In some examples, aspects of the operations of 2010 may be performed by a PEI window transmission component 1345 as described with reference to FIG. 13.

The following provides an overview of aspects of the present disclosure:

Aspect 1: A method for wireless communications at a UE, comprising: receiving signaling indicating a paging early indication configuration associated with an idle or inactive mode for the UE; determining a scheduling conflict during one or more symbols based at least in part on a set of paging early indication occasions being scheduled for at least the one or more symbols based on the paging early indication configuration; and monitoring for at least a portion of the set of paging early indication occasions based at least in part on determining the scheduling conflict.

Aspect 2: The method of aspect 1, wherein the monitoring comprises: monitoring for paging early indication signaling during the one or more symbols or monitoring for downlink signaling during the one or more symbols based at least in part on the paging early indication configuration, wherein the scheduling conflict is based at least in part on the downlink signaling being scheduled during the one or more symbols.

Aspect 3: The method of aspect 2, further comprising: receiving the paging early indication signaling during the one or more symbols based at least in part on the paging early indication configuration assigning a higher priority to the paging early indication signaling than the downlink signaling.

Aspect 4: The method of aspect 2, wherein the monitoring comprises: receiving the downlink signaling during the one or more symbols based at least in part on the paging early indication configuration assigning a higher priority to the downlink signaling than the paging early indication signaling.

Aspect 5: The method of any of aspects 2 through 4, wherein the downlink signaling comprises physical downlink control channel signaling scheduling a paging message, physical downlink control channel signaling scheduling system information, a synchronization signal block, a physical downlink shared channel carrying system information, a tracking reference signal, or any combination thereof.

Aspect 6: The method of any of aspects 1 through 5, wherein the monitoring comprises: monitoring for paging early indication signaling during a shifted set of paging early indication occasions based at least in part on determining the scheduling conflict, wherein the shifted set of paging early indication occasions start at a first symbol period after the scheduling conflict.

Aspect 7: The method of any of aspects 1 through 6, wherein the monitoring comprises: monitoring for paging early indication signaling during the portion of the set of paging early indication occasions excluding the one or more symbols based at least in part on determining the scheduling conflict.

Aspect 8: The method of any of aspects 1 through 7, wherein receiving the signaling indicating the paging early indication configuration comprises: receiving an indication of a maximum number of paging early indication repetitions occasions associated with a paging occasion.

Aspect 9: The method of any of aspects 1 through 8, further comprising: receiving an indication of a number of transmitted paging early indication occasion repetitions in the set of paging early indication occasions.

Aspect 10: The method of aspect 9, wherein the indication is received via an SIB, a previous paging early indication signal, physical downlink control channel signaling scheduling a paging message, or any combination thereof.

Aspect 11: The method of any of aspects 9 through 10, wherein the indication includes an indication of a pattern for the set of paging early indication occasions.

Aspect 12: The method of any of aspects 1 through 11, further comprising: performing blind decoding on the set of paging early indication occasions, wherein a number of paging early indication occasion repetitions associated with the set of paging early indication occasions is based at least in part on a blind decoding capability of the UE.

Aspect 13: The method of any of aspects 1 through 12, further comprising: performing blind decoding on a first paging early indication occasion corresponding to a first subset of the set of paging early indication occasions; ignoring remaining paging early indication occasions corresponding to the first subset of the set of paging early indication occasions based at least in part on the blind decoding on the first paging early indication occasion being unsuccessful; and performing blind decoding on a second subset of the set of paging early indication occasions.

Aspect 14: The method of any of aspects 1 through 12, further comprising: performing blind decoding on a first paging early indication occasion corresponding to a subset of the set of paging early indication occasions; and ignoring a remaining subset of paging early indication occasions based at least in part on the blind decoding on the first paging early indication occasion being successful.

Aspect 15: The method of any of aspects 1 through 14, further comprising: receiving an indication of the scheduling conflict during the one or more symbols; and monitoring for paging early indication signaling during the portion of the set of paging early indication occasions based at least in part on receiving the indication of the scheduling conflict.

Aspect 16: The method of any of aspects 1 through 15, wherein the monitoring comprises: monitoring for paging early indication signaling during the one or more symbols until detection of the paging early indication signaling or until a threshold number of paging early indication occasions have been monitored.

Aspect 17: The method of any of aspects 1 through 16, wherein the monitoring comprises: monitoring for paging early indication signaling during at least the portion of the set of paging early indication occasions based at least in part on being scheduled for a plurality of sets of paging early indication sets.

Aspect 18: The method of aspect 17, further comprising: receiving, via paging early indication signaling in a paging early indication occasion or paging signaling in a paging occasion, an indication to stop monitoring for a remaining portion of the set of paging early indication occasions; and refraining from monitoring for the remaining portion of the set of paging early indication occasions.

Aspect 19: The method of any of aspects 1 through 18, further comprising: refraining from monitoring for paging early indication signaling during the one or more symbols based at least in part on the set of paging early indication occasions having the scheduling conflict with one or more uplink symbols.

Aspect 20: The method of any of aspects 1 through 19, further comprising: determining the scheduling conflict based at least in part on a scheduling of downlink signaling during the one or more symbols.

Aspect 21: The method of any of aspects 1 through 20, further comprising: determining the scheduling conflict based at least in part on a slot format of a slot including the one or more symbols, the slot format configuring the one or more symbols as uplink symbols.

Aspect 22: The method of any of aspects 1 through 21, further comprising: performing blind decoding during one or more paging early indications of the set of paging early indication occasions without detecting paging early indication signaling.

Aspect 23: A method for wireless communications at a UE, comprising: receiving signaling indicating a configuration for a paging early indication window associated with a plurality of paging early indication occasions, the paging early indication window separated from a paging occasion by a gap in time; and determining whether to monitor, while operating in an inactive or idle mode, for paging early indication signaling during one or more of the plurality of paging early indication occasions within the paging early indication window based at least in part on the configuration.

Aspect 24: The method of aspect 23, further comprising: monitoring for paging early indication signaling during the one or more of the plurality of paging early indication occasions within the paging early indication window based at least in part on the configuration; and monitoring for physical downlink control channel signaling during the paging occasion based at least in part on detecting the paging early indication signaling during the one or more of the plurality of paging early indication occasions.

Aspect 25: The method of any of aspects 23 through 24, wherein the monitoring comprises: monitoring for paging early indication signaling during a subset of the plurality of paging early indication occasions based at least in part on determining a scheduling conflict for a remaining subset of paging early indication occasions.

Aspect 26: The method of any of aspects 23 through 25, further comprising: determining none of the plurality of paging early indication occasions are configured within the paging early indication window; and monitoring for physical downlink control channel signaling scheduling paging messages during the paging occasion based at least in part on none of the plurality of paging early indication occasions being configured within the paging early indication window.

Aspect 27: The method of any of aspects 23 through 26, further comprising: determining none of the plurality of paging early indication occasions are configured within the paging early indication window; and refraining from monitoring for physical downlink control channel signaling scheduling paging messages during the paging occasion based at least in part on none of the plurality of paging early indication occasions being configured within the paging early indication window.

Aspect 28: A method for wireless communications at a base station, comprising: transmitting signaling indicating a paging early indication configuration associated with an idle or inactive mode for a UE; determining a scheduling conflict during one or more symbols based at least in part on a set of paging early indication occasions being scheduled for at least the one or more symbols based on the paging early indication configuration; and transmitting paging early indication signaling during at least a portion of the set of paging early indication occasions based at least in part on determining the scheduling conflict.

Aspect 29: The method of aspect 28, wherein the transmitting comprises: transmitting the paging early indication signaling during the one or more symbols or transmitting downlink signaling during the one or more symbols based at least in part on the paging early indication configuration, wherein the scheduling conflict is based at least in part on the downlink signaling and the set of paging early indication occasions being scheduled during the one or more symbols.

Aspect 30: The method of any of aspects 28 through 29, wherein the transmitting comprises: transmitting the paging early indication signaling during a shifted set of paging early indication occasions based at least in part on the scheduling conflict, wherein the shifted set of paging early indication occasions start at a first symbol period after the scheduling conflict.

Aspect 31: The method of any of aspects 28 through 30, wherein the transmitting comprises: transmitting the paging early indication signaling during the portion of the set of paging early indication occasions excluding the one or more symbols based at least in part on the scheduling conflict.

Aspect 32: The method of any of aspects 28 through 31, wherein transmitting the signaling indicating the paging early indication configuration comprises: transmitting an indication of a maximum number of paging early indication repetitions occasions associated with a paging occasion.

Aspect 33: The method of any of aspects 28 through 32, further comprising: transmitting an indication of a number of paging early indication occasion repetitions in the set of paging early indication occasions.

Aspect 34: The method of any of aspects 28 through 33, further comprising: transmitting the paging early indication signaling on a subset of paging early indication occasions of the set of paging early indication occasions; and refraining from transmitting the paging early indication signaling on a remaining subset of paging early indication occasions of the set of paging early indication occasions.

Aspect 35: A method for wireless communications at a base station, comprising: transmitting signaling indicating a configuration for a paging early indication window comprising a plurality of paging early indication occasions, the paging early indication window separated from a paging occasion by a gap in time; and transmitting, to a UE operating in an inactive or idle mode, paging early indication signaling during one or more of the plurality of paging early indication occasions within the paging early indication window based at least in part on the configuration.

Aspect 36: An apparatus for wireless communications at a UE, comprising a processor; memory coupled with the processor; and instructions stored in the memory and executable by the processor to cause the apparatus to perform a method of any of aspects 1 through 19.

Aspect 37: An apparatus for wireless communications at a UE, comprising at least one means for performing a method of any of aspects 1 through 19.

Aspect 38: A non-transitory computer-readable medium storing code for wireless communications at a UE, the code comprising instructions executable by a processor to perform a method of any of aspects 1 through 19.

Aspect 39: An apparatus for wireless communications at a UE, comprising a processor; memory coupled with the processor; and instructions stored in the memory and executable by the processor to cause the apparatus to perform a method of any of aspects 23 through 27.

Aspect 40: An apparatus for wireless communications at a UE, comprising at least one means for performing a method of any of aspects 23 through 27.

Aspect 41: A non-transitory computer-readable medium storing code for wireless communications at a UE, the code comprising instructions executable by a processor to perform a method of any of aspects 23 through 27.

Aspect 42: An apparatus for wireless communications at a base station, comprising a processor; memory coupled with the processor; and instructions stored in the memory and executable by the processor to cause the apparatus to perform a method of any of aspects 28 through 34.

Aspect 43: An apparatus for wireless communications at a base station, comprising at least one means for performing a method of any of aspects 28 through 34.

Aspect 44: A non-transitory computer-readable medium storing code for wireless communications at a base station, the code comprising instructions executable by a processor to perform a method of any of aspects 28 through 34.

Aspect 45: An apparatus for wireless communications at a base station, comprising a processor; memory coupled with the processor; and instructions stored in the memory and executable by the processor to cause the apparatus to perform a method of any of aspects 35 through 35.

Aspect 46: An apparatus for wireless communications at a base station, comprising at least one means for performing a method of any of aspects 35 through 35.

Aspect 47: A non-transitory computer-readable medium storing code for wireless communications at a base station, the code comprising instructions executable by a processor to perform a method of any of aspects 35 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor; and
   a memory coupled with the processor, with instructions stored in the memory, the instructions being executable by the processor to cause the apparatus to:
      receive signaling indicating a paging early indication configuration associated with an idle or inactive mode for the UE, wherein a set of paging early indication occasions scheduled for at least one or more symbols is associated with a scheduling conflict during the one or more symbols;
      perform blind decoding on a first paging early indication occasion corresponding to a subset of the set of paging early indication occasions; and
      ignore a remaining subset of paging early indication occasions based at least in part on the blind decoding on the first paging early indication occasion being successful.

2. The apparatus of claim 1, wherein the instructions are further executable by the processor to cause the apparatus to:
   monitor, during the one or more symbols, for paging early indication signaling or downlink signaling during the one or more symbols based at least in part on the paging early indication configuration, wherein the scheduling conflict is based at least in part on the downlink signaling being scheduled during the one or more symbols.

3. The apparatus of claim 2, wherein the instructions are further executable by the processor to cause the apparatus to:
   receive the paging early indication signaling during the one or more symbols based at least in part on the paging early indication configuration assigning a higher priority to the paging early indication signaling than the downlink signaling.

4. The apparatus of claim 2, wherein the instructions are further executable by the processor to cause the apparatus to:

receive the downlink signaling during the one or more symbols based at least in part on the paging early indication configuration assigning a higher priority to the downlink signaling than the paging early indication signaling.

5. The apparatus of claim 2, wherein the downlink signaling comprises physical downlink control channel signaling scheduling a paging message, physical downlink control channel signaling scheduling system information, a synchronization signal block, a physical downlink shared channel carrying system information, a tracking reference signal, or any combination thereof.

6. The apparatus of claim 1, wherein the instructions are further executable by the processor to cause the apparatus to:
monitor for paging early indication signaling during a shifted set of paging early indication occasions based at least in part on the scheduling conflict, wherein the shifted set of paging early indication occasions start at a first symbol period after the scheduling conflict.

7. The apparatus of claim 1, wherein the instructions are further executable by the processor to cause the apparatus to:
monitor for paging early indication signaling during a portion of the set of paging early indication occasions excluding the one or more symbols based at least in part on the scheduling conflict.

8. The apparatus of claim 1, wherein the instructions to receive the signaling indicating the paging early indication configuration are executable by the processor to cause the apparatus to:
receive an indication of a maximum quantity of paging early indication repetitions occasions associated with a paging occasion.

9. The apparatus of claim 1, wherein the instructions are further executable by the processor to cause the apparatus to:
receive an indication of a quantity of transmitted paging early indication occasion repetitions in the set of paging early indication occasions.

10. The apparatus of claim 9, wherein the indication is received via a system information block (SIB), a previous paging early indication signal, physical downlink control channel signaling scheduling a paging message, or any combination thereof.

11. The apparatus of claim 9, wherein the indication includes an indication of a pattern for the set of paging early indication occasions.

12. The apparatus of claim 1, wherein the instructions are further executable by the processor to cause the apparatus to:
perform blind decoding on the set of paging early indication occasions, wherein a quantity of paging early indication occasion repetitions associated with the set of paging early indication occasions is based at least in part on a blind decoding capability of the UE.

13. The apparatus of claim 1, wherein the instructions are further executable by the processor to cause the apparatus to:
perform blind decoding on a second paging early indication occasion corresponding to a second subset of the set of paging early indication occasions; and
ignore remaining paging early indication occasions corresponding to the second subset of the set of paging early indication occasions based at least in part on the blind decoding on the second first paging early indication occasion being unsuccessful.

14. The apparatus of claim 1, wherein the instructions are further executable by the processor to cause the apparatus to:
receive an indication of the scheduling conflict during the one or more symbols; and
monitor for paging early indication signaling during a portion of the set of paging early indication occasions based at least in part on receiving the indication of the scheduling conflict.

15. The apparatus of claim 1, wherein the instructions are further executable by the processor to cause the apparatus to:
monitor for paging early indication signaling during the one or more symbols until detection of the paging early indication signaling or until a threshold quantity of paging early indication occasions have been monitored.

16. The apparatus of claim 1, wherein the instructions are further executable by the processor to cause the apparatus to:
monitor for paging early indication signaling during at least a portion of the set of paging early indication occasions based at least in part on being scheduled for a plurality of sets of paging early indication sets.

17. The apparatus of claim 16, wherein the instructions are further executable by the processor to cause the apparatus to:
receive, via paging early indication signaling in a paging early indication occasion or paging signaling in a paging occasion, an indication to stop monitoring for a remaining portion of the set of paging early indication occasions; and
refrain from monitoring for the remaining portion of the set of paging early indication occasions.

18. The apparatus of claim 1, wherein the instructions are further executable by the processor to cause the apparatus to:
refrain from monitoring for paging early indication signaling during the one or more symbols based at least in part on the set of paging early indication occasions having the scheduling conflict with one or more uplink symbols.

19. The apparatus of claim 1, wherein the instructions are further executable by the processor to cause the apparatus to:
determine the scheduling conflict based at least in part on a scheduling of downlink signaling during the one or more symbols.

20. The apparatus of claim 1, wherein the instructions are further executable by the processor to cause the apparatus to:
determine the scheduling conflict based at least in part on a slot format of a slot including the one or more symbols, the slot format configuring the one or more symbols as uplink symbols.

21. The apparatus of claim 1, wherein the instructions are further executable by the processor to cause the apparatus to:
perform blind decoding during one or more paging early indications of the set of paging early indication occasions without detecting paging early indication signaling.

22. A method for wireless communications at a user equipment (UE), comprising:
receiving signaling indicating a paging early indication configuration associated with an idle or inactive mode for the UE, wherein a set of paging early indication occasions scheduled for at least one or more symbols is associated with a scheduling conflict during the one or more symbols;
performing blind decoding on a first paging early indication occasion corresponding to a subset of the set of paging early indication occasions; and
ignoring a remaining subset of paging early indication occasions based at least in part on the blind decoding on the first paging early indication occasion being successful.

23. The method of claim 22, further comprising
monitoring, during the one or more symbols, for paging early indication signaling or downlink signaling during the one or more symbols based at least in part on the paging early indication configuration, wherein the scheduling conflict is based at least in part on the downlink signaling being scheduled during the one or more symbols.

24. The method of claim 23, further comprising:
receiving the paging early indication signaling during the one or more symbols based at least in part on the paging early indication configuration assigning a higher priority to the paging early indication signaling than the downlink signaling.

25. The method of claim 23, further comprising:
receiving the downlink signaling during the one or more symbols based at least in part on the paging early indication configuration assigning a higher priority to the downlink signaling than the paging early indication signaling.

26. The method of claim 23, wherein the downlink signaling comprises physical downlink control channel signaling scheduling a paging message, physical downlink control channel signaling scheduling system information, a synchronization signal block, a physical downlink shared channel carrying system information, a tracking reference signal, or any combination thereof.

27. The method of claim 22, further comprising:
monitoring for paging early indication signaling during a shifted set of paging early indication occasions based at least in part on the scheduling conflict, wherein the shifted set of paging early indication occasions start at a first symbol period after the scheduling conflict.

28. An apparatus for wireless communications at a user equipment (UE), comprising:
means for receiving signaling indicating a paging early indication configuration associated with an idle or inactive mode for the UE, wherein a set of paging early indication occasions scheduled for at least one or more symbols is associated with a scheduling conflict during the one or more symbols;
means for performing blind decoding on a first paging early indication occasion corresponding to a subset of the set of paging early indication occasions; and
means for ignoring a remaining subset of paging early indication occasions based at least in part on the blind decoding on the first paging early indication occasion being successful.

29. The apparatus of claim 28, further comprising:
means for monitoring, during the one or more symbols, for paging early indication signaling or downlink signaling during the one or more symbols based at least in part on the paging early indication configuration, wherein the scheduling conflict is based at least in part on the downlink signaling being scheduled during the one or more symbols.

30. The apparatus of claim 29, further comprising:
means for receiving the paging early indication signaling during the one or more symbols based at least in part on the paging early indication configuration assigning a higher priority to the paging early indication signaling than the downlink signaling.

31. A non-transitory computer-readable medium storing code for wireless communications at a user equipment (UE), the code comprising instructions executable by a processor to:
receive signaling indicating a paging early indication configuration associated with an idle or inactive mode for the UE, wherein a set of paging early indication occasions scheduled for at least one or more symbols is associated with a scheduling conflict during the one or more symbols;
perform blind decoding on a first paging early indication occasion corresponding to a subset of the set of paging early indication occasions; and
ignore a remaining subset of paging early indication occasions based at least in part on the blind decoding on the first paging early indication occasion being successful.

32. The non-transitory computer-readable medium of claim 31, wherein the instructions are further executable by the processor to:
monitor, during the one or more symbols, for paging early indication signaling or downlink signaling during the one or more symbols based at least in part on the paging early indication configuration, wherein the scheduling conflict is based at least in part on the downlink signaling being scheduled during the one or more symbols.

33. The non-transitory computer-readable medium of claim 32, wherein the instructions are further executable by the processor to:
receive the paging early indication signaling during the one or more symbols based at least in part on the paging early indication configuration assigning a higher priority to the paging early indication signaling than the downlink signaling.

* * * * *